(12) United States Patent
Choi et al.

(10) Patent No.: US 11,566,179 B2
(45) Date of Patent: Jan. 31, 2023

(54) LIQUID-CRYSTALLINE MEDIUM

(71) Applicant: MERCK PATENT GMBH, Darmstadt (DE)

(72) Inventors: Yong-Hyun Choi, Pyeongtaek (KR); Jae-Hyun Kang, Seoul (KR); Hyun-Jin Yoon, Gyeonggi-do (KR)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 17/254,788

(22) PCT Filed: Jun. 17, 2019

(86) PCT No.: PCT/EP2019/065824
§ 371 (c)(1),
(2) Date: Dec. 21, 2020

(87) PCT Pub. No.: WO2019/243227
PCT Pub. Date: Dec. 26, 2019

(65) Prior Publication Data
US 2021/0277309 A1 Sep. 9, 2021

(30) Foreign Application Priority Data

Jun. 22, 2018 (EP) ..................... 18179224

(51) Int. Cl.
| | | |
|---|---|---|
| *G02F 1/1333* | (2006.01) | |
| *C09K 19/18* | (2006.01) | |
| *C09K 19/30* | (2006.01) | |
| *C09K 19/34* | (2006.01) | |
| *C09K 19/04* | (2006.01) | |

(52) U.S. Cl.
CPC .......... *C09K 19/18* (2013.01); *C09K 19/3059* (2013.01); *C09K 19/3402* (2013.01); *C09K 2019/0466* (2013.01); *C09K 2019/181* (2013.01); *C09K 2019/183* (2013.01); *C09K 2019/3063* (2013.01); *C09K 2019/3422* (2013.01)

(58) Field of Classification Search
CPC ................ C09K 19/18; C09K 19/3059; C09K 19/3402; C09K 2019/0466; C09K 2019/181; G02F 1/1333
See application file for complete search history.

(56) References Cited

U.S. PATENT DOCUMENTS

| | | | | |
|---|---|---|---|---|
| 7,001,646 | B2 * | 2/2006 | Heckmeier | ........ C09K 19/3001 428/1.1 |
| 9,546,181 | B2 * | 1/2017 | Fujimori | ................. C09K 19/32 |
| 2014/0217325 | A1 | 8/2014 | Manabe et al. | |
| 2017/0137713 | A1 | 5/2017 | Wittek et al. | |
| 2017/0349832 | A1 | 12/2017 | Wittek et al. | |

FOREIGN PATENT DOCUMENTS

| | | |
|---|---|---|
| WO | 13034227 A1 | 3/2013 |
| WO | 15169425 A1 | 11/2015 |
| WO | 16096084 A1 | 6/2016 |
| WO | 19243227 A1 | 12/2019 |

OTHER PUBLICATIONS

International Search Report PCT/EP2019/065824 dated Sep. 26, 2019 (pp. 1-3).

* cited by examiner

*Primary Examiner* — Geraldina Visconti
(74) *Attorney, Agent, or Firm* — Millen, White, Zelano and Branigan, P.C.; Harry B. Shubin

(57) ABSTRACT

The present invention relates to a liquid-crystal medium which comprises one or more compounds each of formulae I and II

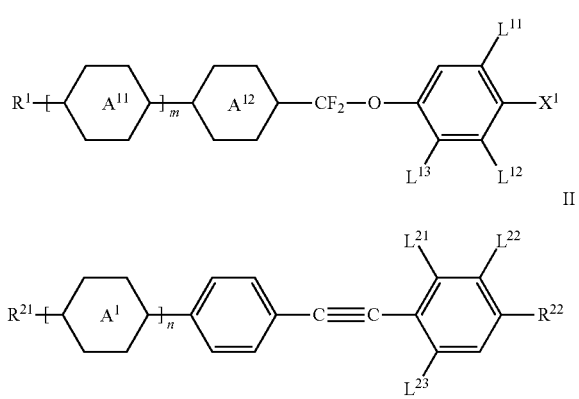

in which the occurring groups and parameters have the meanings given in claim 1.

11 Claims, No Drawings

LIQUID-CRYSTALLINE MEDIUM

The present invention relates to a liquid-crystalline medium for liquid-crystal switchable lenses and to liquid crystal displays capable of displaying 3D images by means of said switchable lenses.

Liquid crystal displays (LCDs) of various types all well-known and widely available in the market. The desire to display images providing a natural viewing experience for the observer recently has led to the introduction of displays capable of displaying three dimensional (3D) images for TV sets, as well as for monitors for desk-top and for lap-top computers and for hand held devices such as for example mobile phones, tablet computers, and portable point of sale displays.

There are several techniques to render the 3D effects in such displays. A first classification can be made distinguishing between various techniques, which all require the observer to wear special glasses to observe the effect, and other techniques, using auto-stereoscopic display principles. The latter do not require the observer to wear glasses, no matter whether active, or passive type glasses.

To some observers the necessity of wearing glasses is rather inconvenient, especially those wearing optical (ophthalmic) glasses already.

Another disadvantage of the 3D rendering techniques requiring glasses is the fact that without glasses the observation is not possible at all and, hence, the maximum number of observers, who may view the display correctly at the same time, is limited by the number of glasses available at a time. Further, the surfaces of glasses are susceptible to degradation. Furthermore, in case of active glasses, which require the active and synchronized operation of the glasses as shutters or polarisation modifiers in matched timing with the panel displaying the image, there is a need to constantly provide the glasses with a synchronization signal. Further it is necessary to frequently recharge their batteries, unless a supply of energy is provided via "wiring" the observer, which can be even more uncomfortable. Due to these drawbacks of the various types of 3D technologies requiring the observer to wear special glasses, presently there is a high demand for displays capable of rendering 3D images without the necessity of using glasses.

Such "glasses-free" 3D techniques are called auto-stereoscopic displays. Currently, there are at least two different types of such displays under development. The first type is using a so-called "parallax barrier" in order to differentiate the pictures viewed by the right and by the left eye, respectively, provided by two separate channels of information. Said parallax barrier blocks for each eye the optical path of the displayed image created for the other eye.

The second type uses "lenticular lenses" to achieve this effect of the separation of the two channels. For this second type there are two different ways of practical realization.

In the first one, called "RM lens" herein, the lenticular lens is realized by the polymerization of an oriented reactive mesogen or mixture of reactive mesogen forming an anisotropic, polymeric liquid crystal lens. This technique, however, requires the use of an additional electro-optical switching element, e.g. a liquid crystal display, to provide the information for the optical image. This, in turn, leads to increased complexity of the design and to increased production costs.

In case the RM lenses are used to convert "2D images to 3D images or vice versa, an additional process to optically bond these 3D lenses to the panel switching the polarization, typically using UV irradiation is required in order to attach the 3D lenses. Thus, UV stability of LC media used is very important in many applications. The panel switching the polarization, together with the bonded RM lenses, typically are attached directly to the image creating panel, which preferable is an LCD.

In the second one, called "LC lens" herein, the lenticular lenses are created using a liquid crystalline medium that is electrically addressed and used to alter its optical state and to directly display the optical information required for the two viewing channels. Such LC lenses are typically bonded directly to the image creating panel.

The $\Delta n$ is a key parameter of LC mixtures for the switchable 3D LC lens because it mainly influences on the quality (depth) of a 3D image and determines the required cell gap. With increasing $\Delta n$ its 3D depth is getting deeper and the cell gap used may be lower. Such a decreased cell gap helps both to reduce the driving voltage and to improve the alignment power, especially for relatively high cell gaps of some few tens of micrometers. In general, $\Delta n$ values in the range of 0.15 to 0.4, depending on the type and application, are required.

Once again, also for the "LC lens" type, there are two possible embodiments. In the first one, called "polymeric mould" type here, the liquid crystalline material is embedded in a mould of a polymeric material. This polymeric material, which may be optically isotropic or anisotropic, typically is located on one of the substrates. The polymeric material is structured in a way to provide the space for the liquid crystal material in the inverse shape of the lenticular lenses to be realized. Typically, the polymeric material forms troughs of inverse lenticular lenses.

In a second embodiment and effect known as "electrically induced birefringence" (short EIB) is made use of. Here, the liquid crystal material is sandwiched between a pair of substrates, one of them being covered with electrodes, which may provide alternating voltages creating an electrical field in the plane of the device, like in an "in plane switching" (IPS) display or in a "fringe field switching" (FFS).

For the practical realization of 3D displays several difficulties have to be overcome with respect to the driving technology and the manufacturing process. In particular, improved liquid crystal materials fulfilling demanding specifications have to be provided. Here, liquid crystalline media with improved performance for switchable 3D LC lenses are proposed.

In the plastic mold type, the LC material is embedded into the mold. A relatively high value of $\Delta n$, typically in the order of 0.2~0.4 is required for this type of LC lens. Additionally, a relatively high value of the dielectric constant ($\Delta\varepsilon$), of 9 or more, or, preferably, even of 40 or more, is typically required to reduce the operating voltage, caused by the comparatively large thickness, or cell gap. Also, an only moderately high rotational viscosity ($\gamma_1$) is required.

In EIB type the orientation of the LC molecules is directly controlled by the applied voltage. Thus, no extremely high values of $\Delta n$ are required. Typically, the values of $\Delta n$ should be in the range of from 0.15 to 0.25. Also, no large cell gap is required. Thus, also rather moderately high positive values of $\Delta\varepsilon$ of up to 5 are sufficient for this type of LC lenses. However, low values of $\gamma_1$ are required in order to achieve a fast response time ($\tau$) especially for devices with multiple viewing points.

As in the manufacturing processes typically UV irradiation is applied, the UV stability of the LC media used is very important in many applications.

The LC compositions known to date are afflicted with disadvantages for the use envisaged here. Besides other deficiencies, most of them result in disadvantageously small modulation of the optical response, slow response or inadequate addressability, requiring high operation voltages or inadequate stability, in particular against UV irradiation.

Novel liquid-crystalline media having improved properties are thus necessary. In particular, the modulation of the optical response, the response time, the operation voltage and the stability have to be improved.

In addition, there is a demand for an improvement in the low-temperature behaviour of the liquid-crystalline media. Both an improvement in the operating properties and also in the shelf life is necessary here.

Thus, there is a considerable demand for liquid-crystalline media having suitable properties for corresponding practical applications. It is an object of the present invention to provide new materials having suitable properties for 3D application enabling applications with improved properties.

In particular it is an object of the present invention to provide materials for switchable lenses of the plastic mould type having suitable properties, especially a suitably high birefringence.

The present invention relates to a liquid-crystal medium comprising
a) one or more compounds of formula I

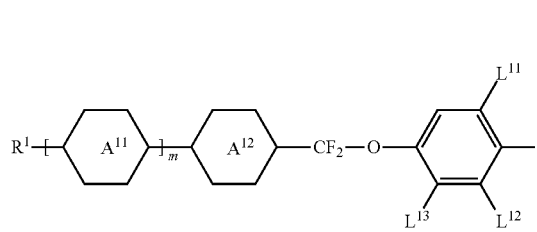

I in which
$R^1$ denotes H, alkyl or alkoxy having 1 to 12 C atoms, or alkenyl, alkenyloxy or alkoxyalkyl having 2 to 12 C atoms, in which one or more $CH_2$-groups may be replaced by

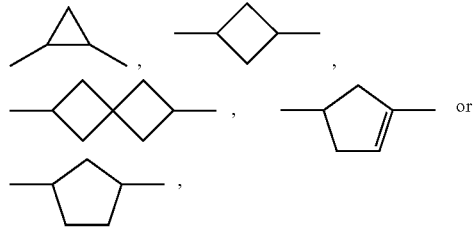

and in all of which one or more H atoms may be replaced by fluorine,

on each occurrence, independently of one another, denotes

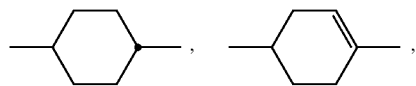

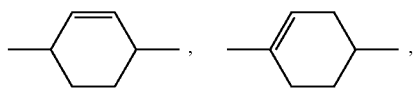

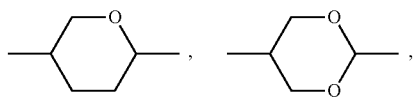

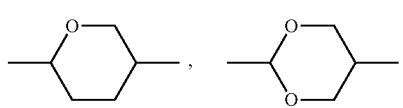

preferably

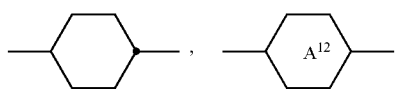

has one of the meanings given for

and alternatively denotes

or

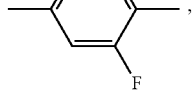

$L^{11}$ and $L^{12}$, independently of one another, denote H or F,
$L^{13}$ denotes H or methyl,
$X^1$ denotes halogen, CN, halogenated alkyl or alkoxy having 1 to 3 C atoms or halogenated alkenyl or alkenyloxy having 2 or 3 C atoms,
m is 0, 1, or 2;

and
b) one or more compounds of formula II

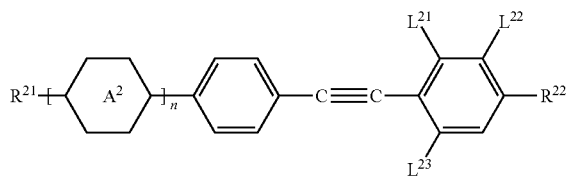
II in which
R$^{21}$ and R$^{22}$ denotes H, alkyl or alkoxy having 1 to 12 C atoms, or alkenyl, alkenyloxy or alkoxyalkyl having 2 to 12 C atoms, in which one or more CH$_2$-groups may be replaced by

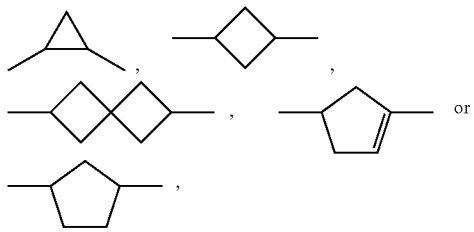

and in all of which one or more H atoms may be replaced by fluorine,
n is 0 or 1,

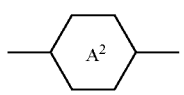

is

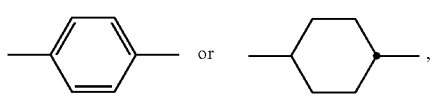

L$^{21}$ to L$^{23}$ are independently of one another H or F.

The medium according to the invention is distinguished by a high clearing point, a suitably high birefringence, a suitable dielectric anisotropy, a high stability of the voltage holding ratio against temperature and UV-load.

Due to the high clearing temperature the medium according to the invention is particularly suitable for automotive applications.

The medium according to the invention is distinguished by a surprisingly high extraordinary refractive index (ne) which enables switchable lenses for displays with improved clarity of the 2D image.

Furthermore, the low dielectric anisotropy of the medium according to the invention compared to media for 3D application from the state of the art surprisingly enables switchable lens arrays with reduced cross-talk while maintaining a sufficiently high birefringence.

In a preferred embodiment of the present invention the medium comprises one or more compounds of formula D

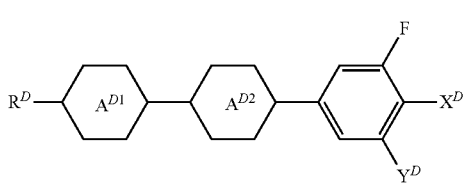
D in which
one of

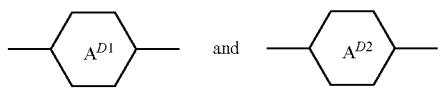

denotes

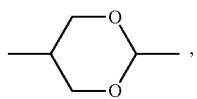

and
the other of

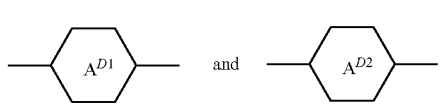

denotes

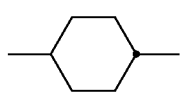

R$^D$ denotes H, alkyl or alkoxy having 1 to 12 C atoms, or alkenyl, alkenyloxy or alkoxyalkyl having 2 to 12 C atoms, in which one or more CH$_2$-groups may be replaced by

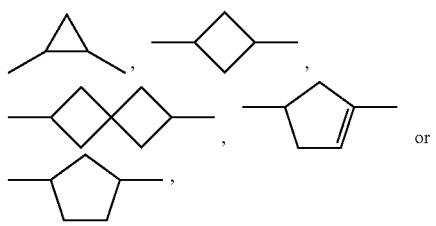

and in all of which one or more H atoms may be replaced by fluorine,
X$^D$ denotes F, CF$_3$ or OCF$_3$, preferably F, and
Y$^D$ denotes H or F, preferably F.

Preferred compounds of formula D are the following compounds D-1 to D-8

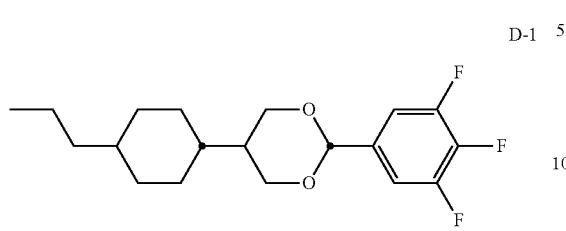
D-1

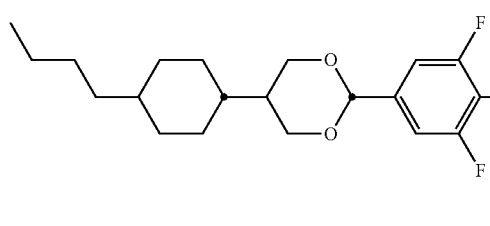
D-2

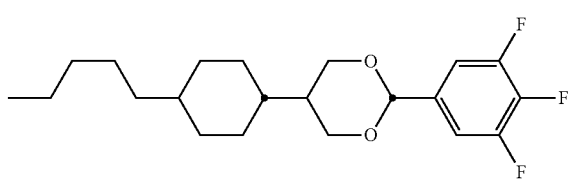
D-3

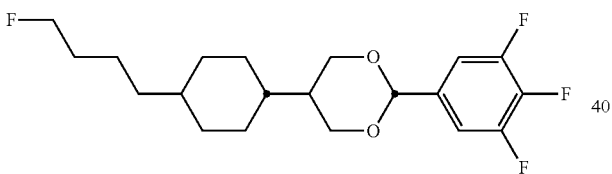
D-4

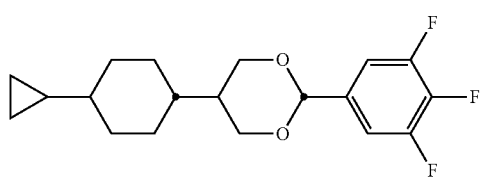
D-5

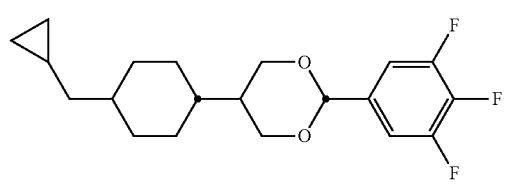
D-6

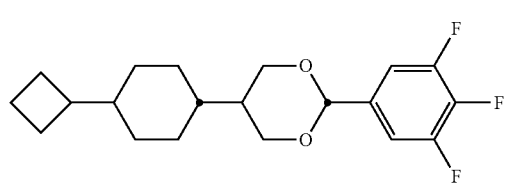
D-7

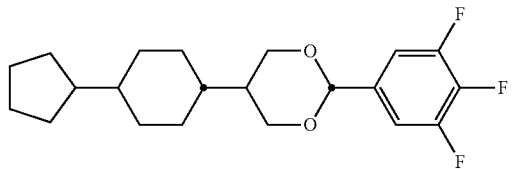
D-8

Preferably, the compounds of formula I are selected from the group of compounds of the formulae I-1 and I-2

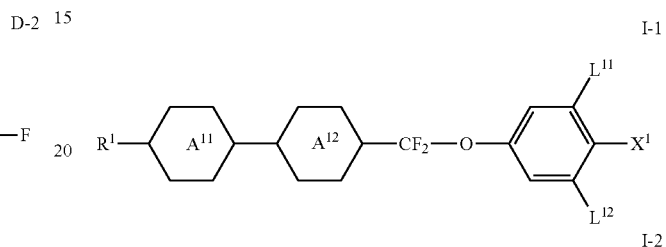
I-1

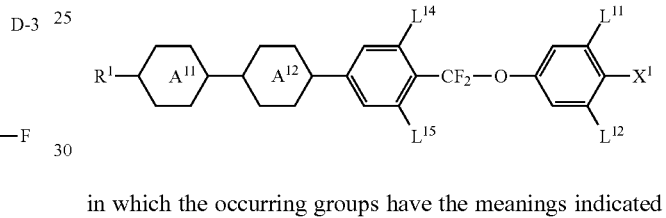
I-2 in which the occurring groups have the meanings indicated above for formula I, and $L^{14}$ and $L^{15}$, independently of one another, denote H or F, and preferably $R^1$ denotes H, alkyl or alkoxy having 1 to 7 C atoms, or alkenyl, alkenyloxy or alkoxyalkyl having 2 to 7 C atoms, in which one or more $CH_2$-groups may be replaced by

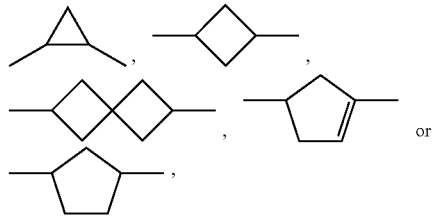

and in all of which one or more H atoms may be replaced by fluorine, $L^{11}$ denotes F, $L^{12}$, $L^{15}$ identically or differently, denote H or F, $L^{14}$ denotes F, $X^1$ denotes F, Cl, CN, $CF_3$, $OCF_3$;

Preferred compounds of the formula I-1 are selected from the following sub-formulae:

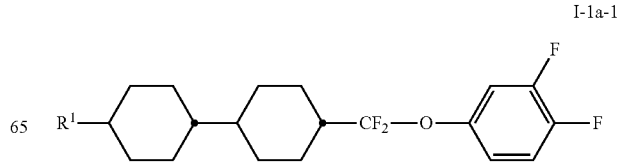
I-1a-1

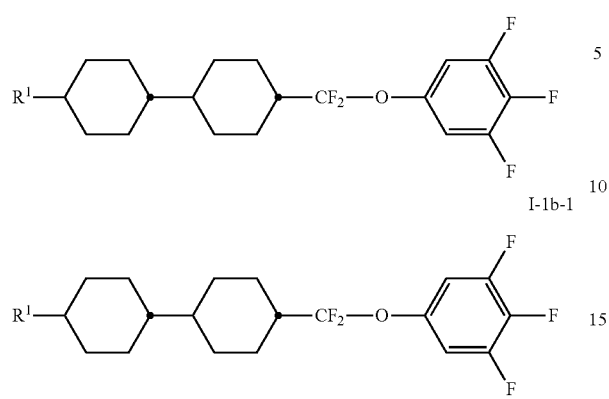
in which R¹ has the meaning indicated above.
Very preferably, the media according to the invention comprise one or more compounds of formula I-1a-2 selected from the following sub-formulae:
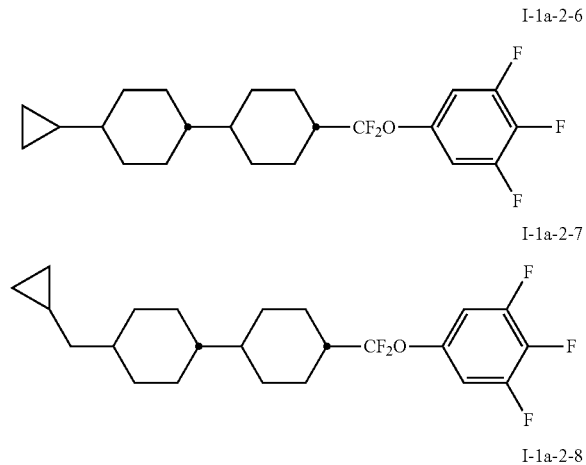
The compounds of the formula I-2 are preferably selected from the group of compounds of the formulae I-2a to 1-2f:
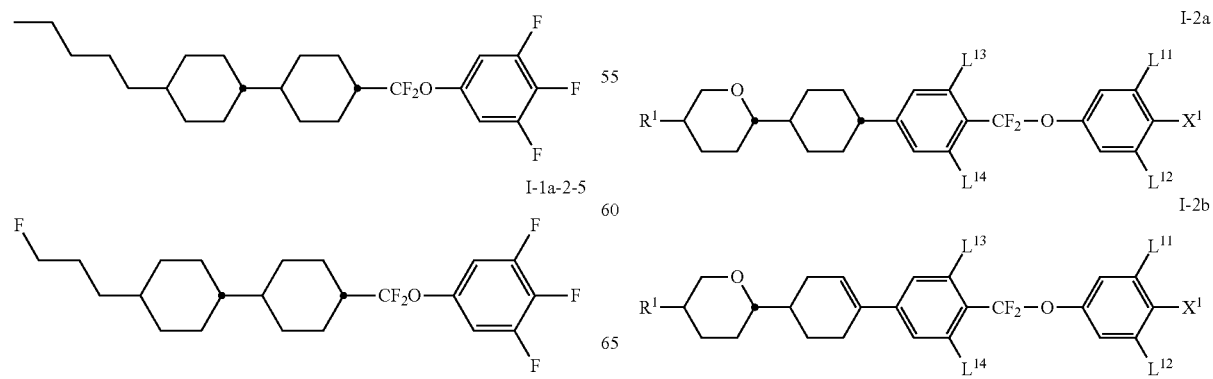

-continued

I-2c
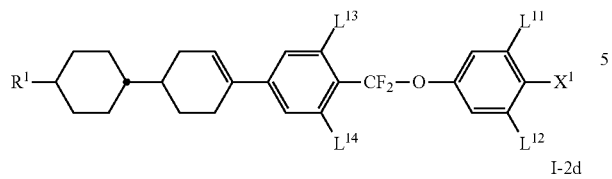

I-2d
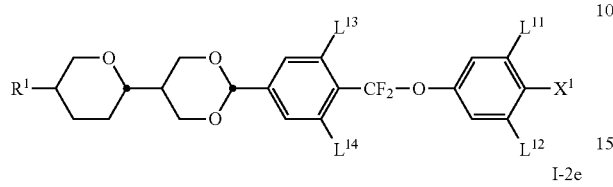

I-2e
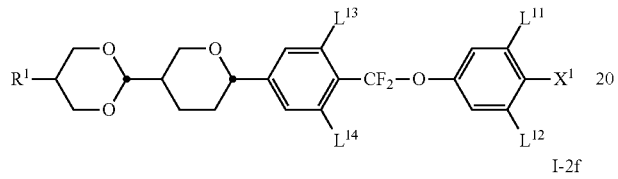

I-2f
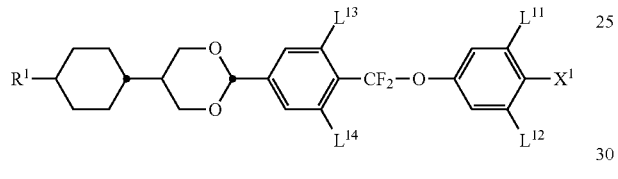

in which the occurring groups have the meanings indicated above;
preferably
$L^{11}$ and $L^{12}$ both denote F and/or $L^{13}$ and $L^{14}$ both denote F; particularly preferably all of $L^{11}$ to $L^{14}$ denote F,
$R^1$ denotes H, alkyl or alkoxy having 1 to 7 C atoms, or alkenyl, alkenyloxy or alkoxyalkyl having 2 to 7 C atoms, in which one or more $CH_2$-groups may be replaced by

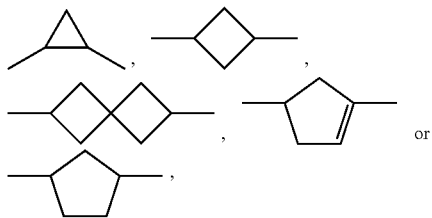

and in all of which one or more H atoms may be replaced by fluorine,
$X^1$ denotes F, Cl, CN, $CF_3$, $OCF_3$.

Particularly preferred compounds of the formula I-2 are the compounds of the following sub-formulae, very particularly preferably of formula I-2f-1:

I-2a-1
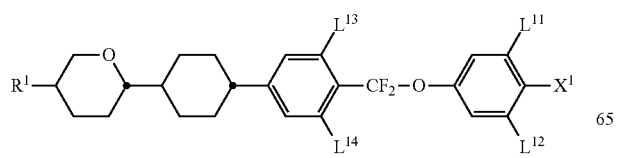

-continued

I-2b-1
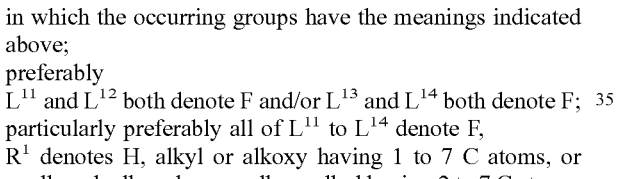

I-2c-1

I-2d-1

I-2f-1

In which $R^1$ and $X^1$ have the meanings given above and preferably
$R^1$ denotes methyl, ethyl, n-propyl, n-butyl or n-pentyl, or cyclopropyl, cyclobutyl or cyclopentyl, and
$X^1$ denotes F.

The compounds of formula II are preferably selected from the group of compounds of formulae II-1 to II-3, particularly preferably from formula II-3

II-1
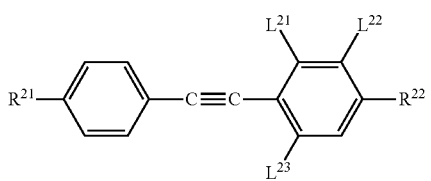

II-2
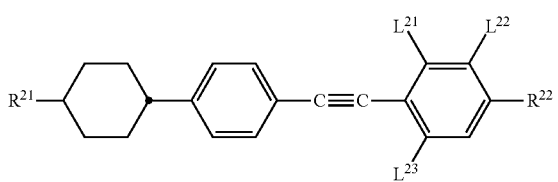

II-3
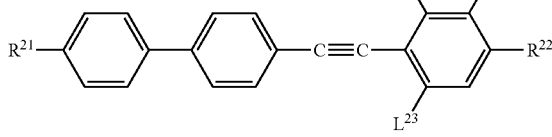

In which the occurring groups have the meanings given above under formula II, and in formulae II-1 and II-2 preferably
R$^{21}$ is n-alkyl or alkenyl having up to 7 C atoms, most preferably n-alkyl having 1 to 5 C atoms, and
R$^{22}$ is n-alkoxy or alkenyloxy having 1 to 6 C atoms, most preferably n-alkoxy having 1 to 4 C atoms,
and in formula II-3 preferably
R$^{21}$ is n-alkyl or alkenyl having up to 7 C atoms, most preferably n-alkyl having 1 to 5 C atoms, and
R$^{22}$ is n-alkyl or alkenyl having up to 7 C atoms, most preferably n-alkyl having up to 5 C atoms.

The liquid-crystal media according to the present invention preferably comprise one or more compounds of formula II-1, preferably selected from the group of compounds of formulae II-1a to II-1d, preferably of formulae II-1a and/or II-1d, most preferably of formula II-1a,

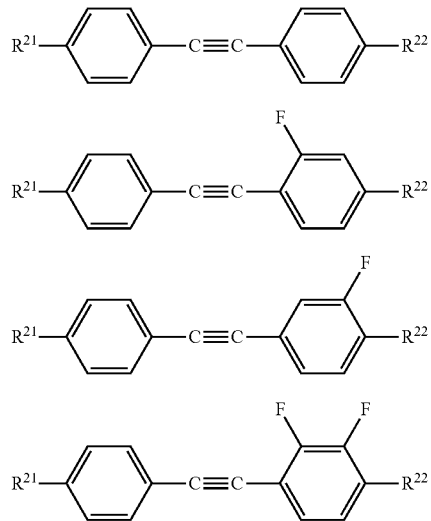

in which the occurring groups have the meanings given above.

The liquid-crystal media according to the present invention preferably comprise one or more compounds of formula II-2, preferably selected from the group of compounds of formulae II-2a to II-2d, preferably of formulae II-2a and/or II-2d, most preferably of formula II-2a,

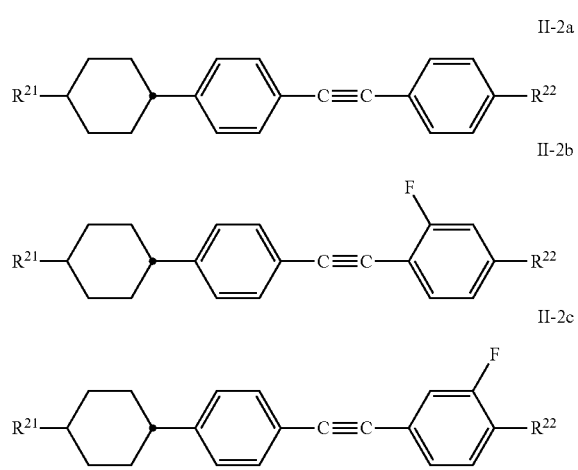

in which the occurring groups have the meanings given above.

The liquid-crystal media according to the present invention preferably comprise one or more compounds of formula II-3, preferably selected from the group of compounds of formulae II-3a to II-3d, preferably of formulae II-3c and/or II-3c and/or II-3d, most preferably of formula II-3d,

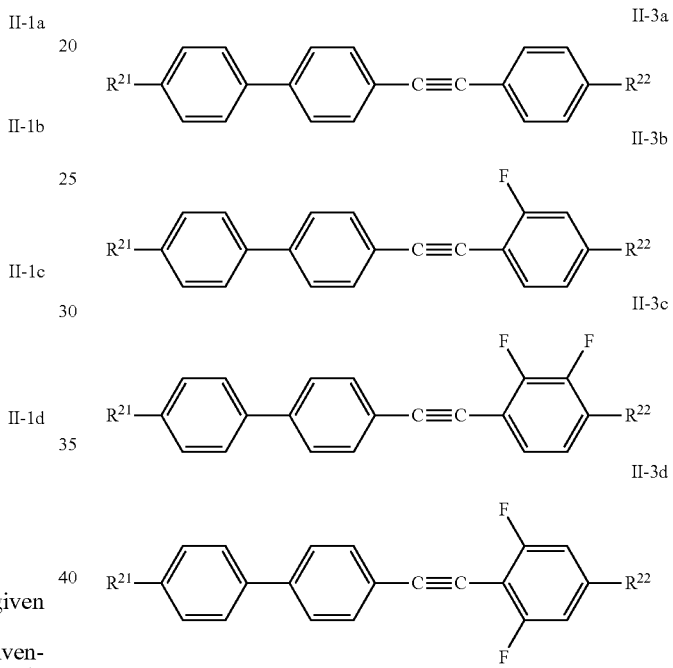

in which the occurring groups have the meanings given above.

Very preferably, the medium comprises one or more compounds of formula II-3d.

Preferably, the medium according to the invention comprises one or more compounds selected from the group of formulae III and IV

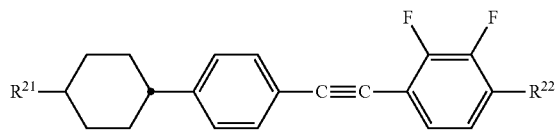

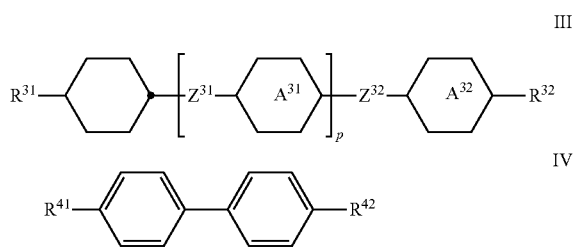

wherein
R$^{31}$, R$^{32}$, R$^{41}$ and R$^{42}$ are independently of each other alkyl, which is straight chain or branched, preferably has 1 to 20

C-atoms, is non-substituted, mono- or poly-substituted by F, Cl or CN, preferably by F, and in which one or more CH$_2$ groups are optionally replaced, in each case independently from one another, by —O—, —S—, —CO—, —COO—, —OCO—, —OCO—O—, —S—CO—, —CO—S—, —CH=CH— or —C≡C— in such a manner that O and/or S atoms are not linked directly to one another, preferably n-alkyl or n-alkoxy with 1 to 9 C-atoms, more preferably with 2 to 5 C-atoms; or alkenyl, alkenyloxy or alkoxyalkyl with 2 to 9 C-atoms, more preferably with 2 to 5 C-atoms or halogenated alkyl, halogenated alkenyl or halogenated alkoxy with preferably up to 9 C-atoms, preferably mono fluorinated, difluorinated or oligofluorinated alkyl, alkenyl or alkoxy with preferably up to 9 C-atoms, most preferably n-alkyl, n-alkoxy, alkenyl, alkenyloxy or alkoxyalkyl with preferably up to 9 C-atoms,

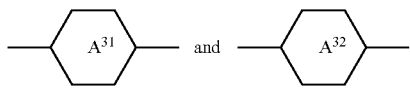

are independently of each other

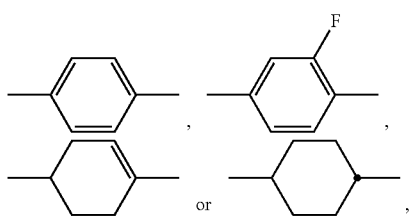

Z$^{31}$ and Z$^{32}$ on each occurrence, identically or differently, denote —CH$_2$CH$_2$—, —CF$_2$CF$_2$—, —CF$_2$CH$_2$—, —COO—, trans- —CH=CH—, trans- —CF=CF—, —CH$_2$O—, —CF$_2$O—, —C≡C— or a single bond, preferably at least one denotes a single bond p is 0 or 1.

Preferably the liquid-crystal media according to the present invention comprise one or more compounds of formula III, preferably selected from the group of compounds of formulae of formulae III-1 to III-3:

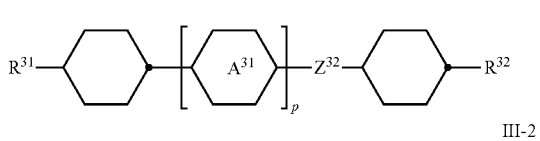

III-1

III-2

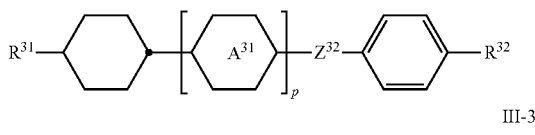

III-3 wherein the parameters have the respective meanings given above and preferably

Z$^{31}$, Z$^{32}$ denote, identically or differently, CH$_2$O, —C(O)O— or a single bond, R$^{31}$ denotes non-fluorinated alkyl or non-fluorinated alkoxy, each having 1 to 9 C atoms, or non-fluorinated alkenyl, non-fluorinated alkenyloxy or non-fluorinated alkoxyalkyl, each having 2 to 9 C atoms, preferably alkyl, particularly preferably n-alkyl having 1 to 5 C atoms, R$^{32}$ denotes H, non-fluorinated alkyl or non-fluorinated alkoxy, each having 1 to 5, preferably 1 to 3, particularly preferably 3, C atoms, p is 0 or 1, more preferably R$^{31}$ denotes C$_n$H$_{2n+1}$ or CH$_2$=CH—(CH$_2$)$_z$ and R$^{32}$ denotes C$_m$H$_{2m+1}$ or O—C$_m$H$_{2m+1}$ or (CH$_2$)$_z$—CH=CH$_2$, in which n and m, independently of one another, denote an integer in the range from 0 to 20, preferably in the range from 1 to 9 and particularly preferably 1 to 5, and z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$).

Preferably the liquid-crystal media according to the present invention comprise one or more compounds of formula III-1, preferably selected from the group of compounds of formulae of formulae III-1a to III-1c, preferably of formulae III-1a and/or III-1c, most preferably of formula III-1a,

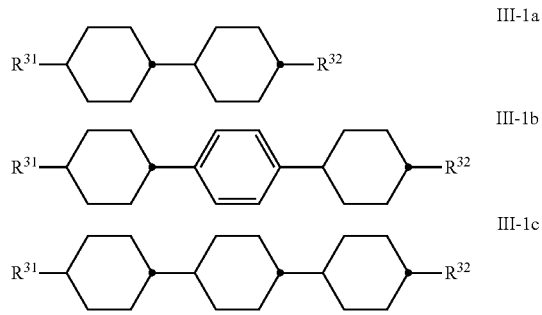

wherein the parameters have the respective meanings given above.

Preferably the liquid-crystal media according to the present invention comprise one or more compounds of formula III-2, preferably selected from the group of compounds of formulae of formulae III-2a to III-2d, preferably selected from formulae III-2a, III-2b and III-2d, most preferably of formula III-2a

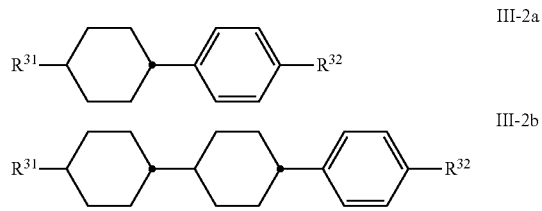

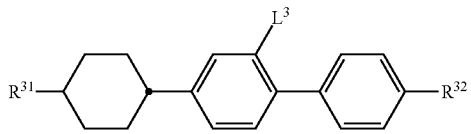

wherein the parameters have the respective meanings given above, and preferably
$R^{31}$ denotes non-fluorinated alkyl or non-fluorinated alkoxy, each having 1 to 15 C atoms, or non-fluorinated alkenyl, non-fluorinated alkenyloxy or non-fluorinated alkoxyalkyl, each having 2 to 15 C atoms, preferably alkyl, particularly preferably n-alkyl,
$R^{32}$ denotes H, non-fluorinated alkyl or non-fluorinated alkoxy, each having 1 to 5, preferably 1 to 3, particularly preferably 3, C atoms,
more preferably
$R^{31}$ denotes $C_nH_{2n+1}$ or $CH_2=CH-(CH_2)_z$ and
$R^{32}$ denotes $C_mH_{2m+1}$ or $O-C_mH_{2m+1}$ or $(CH_2)_z-CH=CH_2$,
in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{31}$ and $R^{32}$) here are, in particular, ($C_nH_{2n+1}$ and $C_mH_{2m+1}$) and ($C_nH_{2n+1}$ and $O-C_mH_{2m+1}$).

Preferably the liquid-crystal media according to the present invention comprise one or more compounds of formula III-3, preferably selected from the group of compounds of formulae of formulae III-3a to III-3d, particularly preferably of formula III-2a

III-3a

III-3b

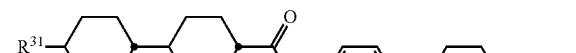

III-3c

III-3d

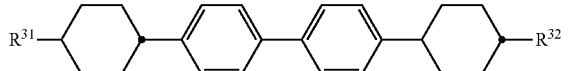

III-3e

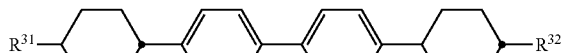

in which $L^3$ denotes H or F, preferably F, and $R^{31}$ and $R^{32}$ have the meanings given above,
and preferably
$R^{31}$ denotes non-fluorinated alkyl or non-fluorinated alkoxy, each having 1 to 15 C atoms, or non-fluorinated alkenyl, non-fluorinated alkenyloxy or non-fluorinated alkoxyalkyl, each having 2 to 15 C atoms, preferably alkyl, particularly preferably n-alkyl,
$R^{32}$ denotes H, non-fluorinated alkyl or non-fluorinated alkoxy, each having 1 to 5, preferably 1 to 3, particularly preferably 3, C atoms, more preferably
$R^{31}$ denotes $C_nH_{2n+1}$ or $CH_2=CH-(CH_2)_z$ and
$R^{32}$ denotes $C_mH_{2m+1}$ or $O-C_mH_{2m+1}$ or $(CH_2)_z-CH=CH_2$,
in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

In a preferred embodiment of the present invention the liquid crystal media comprise one or more compounds of formula IV, preferably of compounds of formula IV, wherein
$R^{41}$ is n-alkyl or alkenyl, more preferably n-alkyl, and, most preferably $C_nH_{2n+1}$, and
$R^{42}$ is alkenyl, more preferably $CH_2=CH-[CH_2-]z$, $CH_3-CH_2=CH-[CH_2-]z$, $[-CH_2]_2-CH=CH_2$ or $[-CH_2]_2-CH=C-CH_3$, in which
n is an integer in the range from 0 to 15, preferably in the range from 1 to 7 and particularly preferably 1 to 5, and
z is 0, 1, 2, 3 or 4, preferably 0 or 2.

The medium according to the invention preferably comprises one or more compounds of formula V

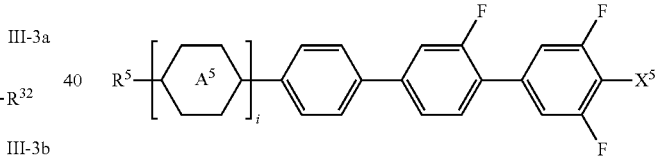

V in which

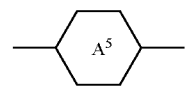

is

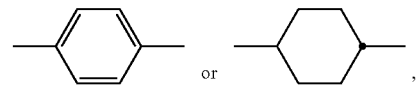

preferably

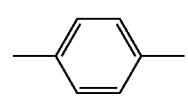

$R^5$ are independently of each other alkyl, which is straight chain or branched, preferably has 1 to 20 C-atoms, is non-substituted, mono- or poly-substituted by F, Cl or CN, preferably by F, and in which one or more $CH_2$ groups are optionally replaced, in each case independently from one another, by —O—, —S—, —CO—, —COO—, —OCO—, —OCO—O—, —S—CO—, —CO—S—, —CH=CH— or —C≡C— in such a manner that 0 and/or S atoms are not linked directly to one another, preferably n-alkyl or n-alkoxy with 1 to 9 C-atoms, more preferably with 2 to 5 C-atoms; or alkenyl, alkenyloxy or alkoxyalkyl with 2 to 9 C-atoms, more preferably with 2 to 5 C-atoms or halogenated alkyl, halogenated alkenyl or halogenated alkoxy with preferably up to 9 C-atoms, preferably mono fluorinated, difluorinated or oligofluorinated alkyl, alkenyl or alkoxy with preferably up to 9 C-atoms, most preferably n-alkyl, n-alkoxy, alkenyl, alkenyloxy or alkoxyalkyl with preferably up to 9 C-atoms, $X^5$ is halogen, $CF_3$ or $OCF_3$, preferably F or $OCF_3$, $Y^{01}$, $Y^{02}$, $R^{01}$ and $R^{02}$ have the respective meanings given under formula I above, and i is 0 or 1.

The liquid-crystal media according to the present invention comprise one or more compounds of formula I preferably selected from the group of compounds of formulae I-1 to 1-3, preferably selected from formulae I-1 and 1-2 and, more preferably one or more compounds each of formula I-1 and of formula I-2.

The liquid-crystal media according to the present invention comprise one or more compounds of formula V preferably selected from the group of compounds of formulae V-1 to V-3, preferably selected from formulae V-1 and 1-3 and, more preferably one or more compounds of formula V-1,

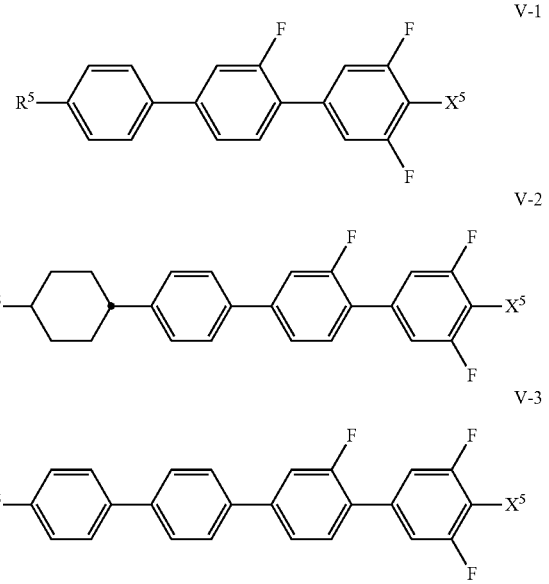

in which the occurring groups have the meanings given above, and preferably $R^5$ denotes non-fluorinated alkyl or non-fluorinated alkoxy, each having 1 to 15 C atoms, or non-fluorinated alkenyl, non-fluorinated alkenyloxy or non-fluorinated alkoxyalkyl, each having 2 to 15 C atoms, preferably alkyl, particularly preferably n-alkyl, and $X^5$ denotes F, $CF_3$ or $OCF_3$, H, preferably $OCF_3$.

In a preferred embodiment, the liquid crystal medium according to the invention comprises one or more compounds of formula VI and VIA

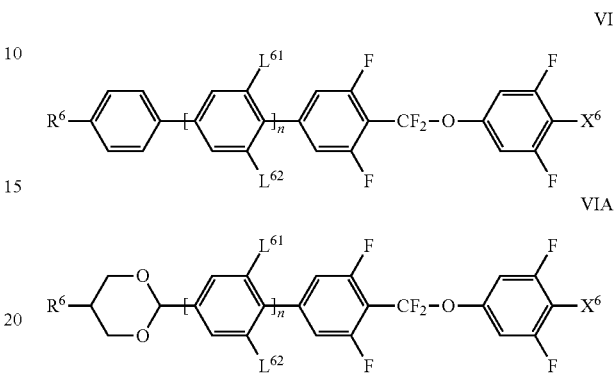

in which $R^6$ are independently of each other alkyl, which is straight chain or branched, preferably has 1 to 20 C-atoms, is non-substituted, mono- or poly-substituted by F, Cl or CN, preferably by F, and in which one or more $CH_2$ groups are optionally replaced, in each case independently from one another, by —O—, —S—, —CO—, —COO—, —OCO—, —OCO—O—, —S—CO—, —CO—S—, —CH=CH— or —C≡C— in such a manner that 0 and/or S atoms are not linked directly to one another, preferably n-alkyl or n-alkoxy with 1 to 9 C-atoms, more preferably with 2 to 5 C-atoms; or alkenyl, alkenyloxy or alkoxyalkyl with 2 to 9 C-atoms, more preferably with 2 to 5 C-atoms or halogenated alkyl, halogenated alkenyl or halogenated alkoxy with preferably up to 9 C-atoms, preferably mono fluorinated, difluorinated or oligofluorinated alkyl, alkenyl or alkoxy with preferably up to 9 C-atoms, most preferably n-alkyl, n-alkoxy, alkenyl, alkenyloxy or alkoxyalkyl with preferably up to 9 C-atoms, $X^6$ is F, Cl, $CF_3$ or $OCF_3$, preferably F, $L^{61}$ and $L^{62}$ are independent of each other H or F, preferably at least one of them, more preferably one of them is F, n is 0 or 1, $Y^{01}$ and $Y^{02}$ are, independently of each other, F, Cl or CN, and alternatively one of them may be H, and $R^{01}$ and $R^{02}$ are, independently of each other, H or alkyl with 1 to 12 C-atoms.

The compounds of formula VI are preferably selected from the group of compounds of formulae VI-1 to VI-3 and VIA-1, preferably selected from formulae VI-1 and VI-2 and, more preferably one or more compounds each of formula VI-1 and of formula VI-2

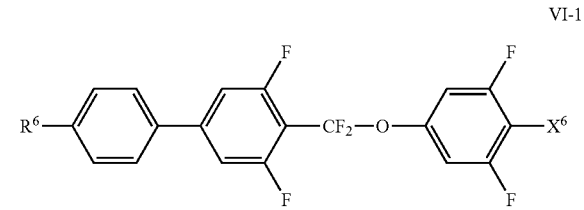

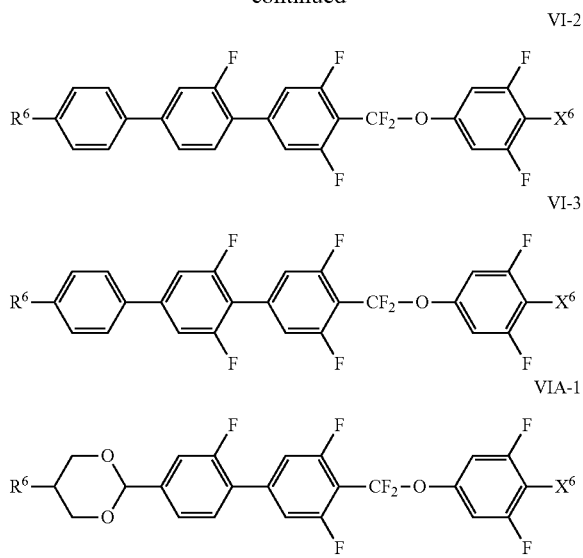

in which
the occurring groups have the meanings given above under formula I and preferably
$R^6$ is n-alkyl or alkenyl having 1 to 7 C atoms, most preferably n-alkyl having 1 to 5 C atoms, and
$X^6$ is F, Cl or $CF_3$, most preferably F.

In a preferred embodiment of the present invention, the liquid-crystal medium comprises one or more compounds of the formulae I-1 and II-3.

Other mesogenic compounds which are not explicitly mentioned above can optionally and advantageously also be used in the media in accordance with the present invention. Such compounds are known to the person skilled in the art.

The liquid-crystal media in accordance with the present invention preferably have a clearing point of 90° C. or more, more preferably 95° C. or more, particularly preferably 100° C. or more.

The nematic phase of the media according to the invention preferably extends down to a lower temperature of 10° C. or less, more preferably down to 0° C. or less, even more preferably down to −10° C. or less and, most preferably down to −20° C. or less. At the same time, it preferably extends up to an upper temperature of to 90° C. or more, preferably up to 95° C. or more, more preferably up to 100° C. or more and, in particular, up to 110° C. or more.

Preferably, the dielectric anisotropy (Δε) of the liquid-crystal medium in accordance with the invention, at 1 kHz and 20° C., is in the range of from 2 to 20, preferably from 5 to 15 and particularly preferably from 7 to 12.

The Δn of the liquid-crystal media in accordance with the present invention, at 589.3 nm ($Na^D$) and 20° C., is preferably in the range of from 0.100 to 0.400, more preferably from 0.110 to 0.300, even more preferably from 0.120 to 0.200 or less and very particularly preferably in the range from 0.130 to 0.150.

In accordance with the present invention, the compounds of the formula I are preferably used in the liquid-crystal media in a total concentration of 5% or more to 60% or less, more preferably of 10% or more to 55% or less, even more preferably of 25% or more to 45% or less and, most preferably, of 30% or more to 40% or less, of the mixture as a whole.

In particular, the compounds of formula I-1 preferably are used in the liquid-crystal media in a total concentration of 5% or more to 50% or less, more preferably of 10% or more to 40% or less and, most preferably, of 20% or more to 30% or less, of the mixture as a whole and the compounds of formula I-2 preferably are used in the liquid-crystal media in a total concentration of 2% or more to 20% or less, more preferably of 3% or more to 18% or less, even more preferably of 5% or more to 15% or less and, most preferably, of 8% or more to 13% or less, of the mixture as a whole.

According to the present invention, the compounds of the formula II are preferably used in the liquid-crystal media in a total concentration of 5% or more to 30% or less, more preferably of 10% or more to 25% or less and, most preferably, of 15% or more to 20% or less, of the mixture as a whole.

In accordance with the present invention, the compounds of the formula D are preferably used in the liquid-crystal media in a total concentration of 2% or more to 25% or less, more preferably 4% or more to 20% or less, even more preferably 5% or more to 15% or less and very preferably 7% or more to 10% or less, of the mixture as a whole.

In accordance with the present invention, the compounds of the formula III are preferably used in the liquid-crystal media in a total concentration of 20% or more to 60%, more preferably 30% or more to 50% or less, and very preferably 35% or more to 45% or less, of the mixture as a whole.

In accordance with the present invention, the compounds of the formula III-3 are preferably used in the liquid-crystal media in a total concentration of 0.5% or more to 10%, more preferably 1% or more to 8% or less, even more preferably 2% or more to 6% or less and very preferably 3% or more to 4% or less, of the mixture as a whole.

In accordance with the present invention, the compounds of the formula IV are preferably used in the liquid-crystal media in a total concentration of 0% or more to 20% or less, more preferably 0% or more to 15% or less, even more preferably 1% or more to 10% or less and very preferably 2% or more to 8% or less, of the mixture as a whole.

In accordance with the present invention, the compounds of the formula V are preferably used in the liquid-crystal media in a total concentration of 2% or more to 25% or less, more preferably 4% or more to 20% or less, even more preferably 5% or more to 15% or less and very preferably 7% or more to 10% or less, of the mixture as a whole.

In accordance with the present invention, the compounds of the formula VI are preferably used in the liquid-crystal media in a total concentration of 0% or more to 20% or less, more preferably 0% or more to 15% or less, even more preferably 1% or more to 10% or less and very preferably 2% or more to 5% or less, of the mixture as a whole.

Preferably, the medium according to the invention comprises one or more compounds of formula D and one or more compounds of formula I-1 in a total concentration in the range of from 15% to 50%, preferably from 20% to 40% and particularly preferably from 25% to 30%.

Preferably, the medium according to the invention comprises one or more compounds of formula D and one or more compounds of formula I-1 and one or more compounds of formula I-2 in a total concentration in the range of from 25% to 60%, preferably from 30% to 50% and particularly preferably from 35% to 40%.

In a preferred embodiment of the present invention the liquid-crystal media comprise
one or more of the compounds CCQU-n-F and/or CDU-n-F and/or one or more of the compounds CDUQU-n-F and/or
one or more of the compounds PPTUI-3-2 and/or PPTUI-3-4 and/or
one or more of the compounds CC-3-01 and/or CC-3-02 and/or CP-3-01 and/or CP-3-02.

The respective abbreviations are created according to tables A to C and are explained in table D.

Herein, the expression dielectrically positive describes compounds or components where $\Delta\varepsilon>3.0$, dielectrically neutral describes those where $-1.5\leq\Delta\varepsilon\leq3.0$ and dielectrically negative describes those where $\Delta\varepsilon<-1.5$. $\Delta\varepsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

The following definitions apply here.

$$\Delta\varepsilon=(\varepsilon_{\parallel}-\varepsilon_{\perp}) \text{ and}$$

$$\varepsilon_{average}=(\varepsilon_{\parallel}+2\,\varepsilon_{\perp})/3.$$

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such. All others are treated like compounds.

Herein, the expression "threshold voltage" refers to the optical threshold and is quoted for 10% relative contrast ($V_{10}$), "mid-grey voltage" is the voltage for 50% relative contrast ($V_{50}$) and the expression "saturation voltage" refers to the optical saturation and is quoted for 90% relative contrast ($V_{90}$), in all cases unless expressly stated otherwise. All characteristic voltages are determined for perpendicular observation. The capacitive threshold voltage ($V_0$), also called the Freedericks threshold ($V_{Fr}$), is only used if expressly mentioned.

Herein, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\varepsilon$) is determined at a frequency of 1 kHz. The threshold voltages, as well as all other electro-optical properties, are determined using test cells produced at Merck KGaA, Germany. The test cells for the determination of $\Delta\varepsilon$ have a cell thickness of approximately 20 µm. The electrode is a circular ITO electrode having an area of 1.13 cm² and a guard ring. The orientation layers are SE-1211 from Nissan Chemicals, Japan, for homeotropic orientation ($\varepsilon_{\parallel}$) and polyimide AL-1054 from Japan Synthetic Rubber, Japan, for homogeneous orientation ($\varepsilon_{\perp}$). The capacitances are determined using a Solatron 1260 frequency response analyser using a sine wave with a voltage of 0.3 $V_{rms}$.

The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

Herein, the term "compounds" does mean both one compound and a plurality of compounds, unless expressly stated otherwise.

The liquid-crystal media according to the invention preferably have nematic phases of in each case at least from −20° C. to 80° C., preferably from −30° C. to 85° C. and very particularly preferably from −40° C. to 100° C. The expression have a nematic phase here means on the one hand that no smectic phase and no crystallisation are observed at low temperatures at the corresponding temperature and on the other hand that no clearing occurs on heating from the nematic phase. The investigation at low temperatures is carried out in a flow viscometer at the corresponding temperature and checked by storage in test cells having a layer thickness of 5 µm for at least 100 hours. At high temperatures, the clearing point is measured in capillaries by conventional methods.

The clearing point (T(N,I)) of the liquid crystalline media preferably is 90° C. or more, more preferably 95° C. or more and particularly preferably 100° C. or more.

The liquid-crystal media according to the invention are also characterised by suitable rotational viscosities ($\gamma_1$). The rotational viscosities are preferably 350 mPa·s or less, more preferably 300 mPa·s or less, even more preferably 280 mPa·s or less and most preferably 250 mPa·s or less. Preferably the rotational viscosities of the media are as low as possible. However, a possible practical lower limit could be 100 mPa·s or more or even 150 mPa·s or more.

In the corresponding geometry, the preferred liquid-crystal materials have excellent properties for 3D lenses, especially of the polymer mould type.

The term "alkyl" preferably encompasses straight-chain and branched alkyl groups, as well as cycloalkyl groups, each having 1 to 15 carbon atoms, in particular the straight-chain groups methyl, ethyl, propyl, butyl, pentyl, hexyl and heptyl, as well as cyclopropyl and cyclohexyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluoro-butyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, in which n and m each, independently of one another, denote an integer from 1 to 10. Preferably, n here is 1 and m is 1 to 6.

Compounds containing a vinyl end group and compounds containing a methyl end group have low rotational viscosity.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media according to the invention.

The liquid-crystal media according to the invention consist of a plurality of compounds, preferably 3 to 30, more preferably 4 to 20 and very preferably 4 to 15 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called premixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations also referred to as acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, having n, m and l C atoms respectively, where n, m and l, independently of one another, denote an integer from 1 to 9, preferably 1 to 7, or from 2 to 9, preferably 2 to 7, respectively. $C_oH_{2o+1}$ denotes straight-chain alkyl having 1 to 7, preferably 1 to 4, C atoms, or branched alkyl having 1 to 7, preferably 1 to 4, C atoms.

Table A lists the codes used for the ring elements of the core structures of the compounds, while Table C shows the linking groups. Table C gives the meanings of the codes for the left-hand or right-hand end groups. Table D shows illustrative structures of compounds with their respective abbreviations.

TABLE A

| Ring elements | |
|---|---|
| C |  |

TABLE A-continued

| Ring elements | |
|---|---|
| P | 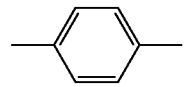 |
| D | 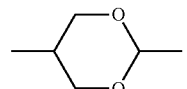 |
| DI | 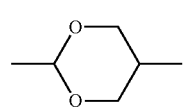 |
| A | 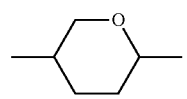 |
| AI | 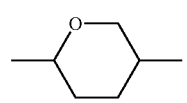 |
| G | 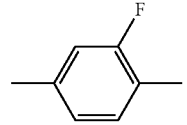 |
| GI | 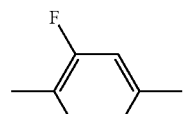 |
| U | 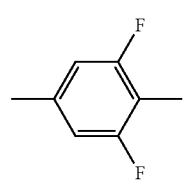 |
| UI | 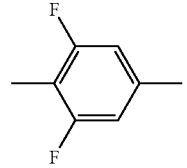 |
| Y | 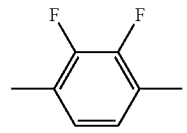 |
| M | 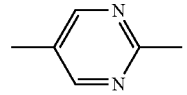 |
| MI | 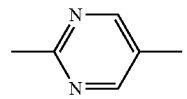 |

TABLE A-continued

| Ring elements | |
|---|---|
| N | 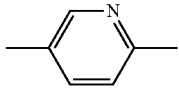 |
| NI | 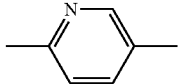 |
| fN | 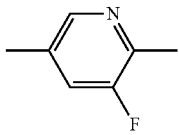 |
| fNI | 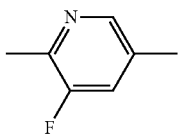 |
| dH | 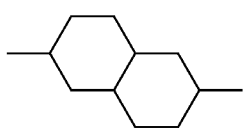 |
| N(2,6) | 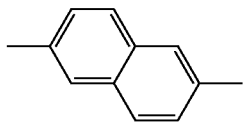 |
| K | 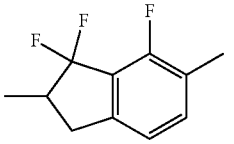 |
| KI | |
| L | |
| LI | |
| F | |
| FI | |

TABLE B

| Linking groups | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | | |

TABLE C

| End groups | | | |
|---|---|---|---|
| Left-hand side | | Right-hand side | |
| Use alone | | | |
| -n- | C$_n$H$_{2n+1}$— | -n | —C$_n$H$_{2n+1}$ |
| -nO— | C$_n$H$_{2n+1}$—O— | -nO | —O—C$_n$H$_{2n+1}$ |
| —V— | CH$_2$=CH— | —V | —CH=CH$_2$ |
| -nV— | C$_n$H$_{2n+1}$—CH=CH— | -nV | —C$_n$H$_{2n}$—CH=CH$_2$ |
| —Vn- | CH$_2$=CH—C$_n$H$_{2n+1}$— | —Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| —N— | N≡C— | —N | —C≡N |
| —S— | S=C=N— | —S | —N=C=S |
| —F— | F— | —F | —F |
| —CL— | Cl— | —CL | —Cl |
| —M— | CFH$_2$— | —M | —CFH$_2$ |
| —D— | CF$_2$H— | —D | —CF$_2$H |
| —T— | CF$_3$— | —T | —CF$_3$ |
| —MO— | CFH$_2$O— | —OM | —OCFH$_2$ |
| —DO— | CF$_2$HO— | —OD | —OCF$_2$H |
| —TO— | CF$_3$O— | —OT | —OCF$_3$ |
| —OXF— | CF$_2$=CH—O— | —OXF | —O—CH=CF$_2$ |
| —A— | H—C≡C— | —A | —C≡C—H |
| -nA— | C$_n$H$_{2n+1}$—C≡C— | —An | —C≡C—C$_n$H$_{2n+1}$ |
| —NA— | N≡C—C≡C— | —AN | —C≡C—C≡N |

TABLE C-continued

| End groups | |
|---|---|
| Left-hand side | Right-hand side |

| Use together with others | | | |
|---|---|---|---|
| - ... A ... - | —C≡C— | - ... A ... | —C≡C— |
| - ... V ... - | —CH=CH— | - ... V ... | —CH=CH— |
| - ... Z ... - | —CO—O— | - ... Z ... | —CO—O— |
| - ... ZI ... - | —O—CO— | - ... ZI ... | —O—CO— |
| - ... K ... - | —CO— | - ... K ... - | —CO— |
| - ... W ... - | —CF=CF— | - ... W ... - | —CF=CF— | in which n and m each denote integers, and the three dots " ... " are place-holders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

The illustrative structures show compounds which are particularly preferably employed.

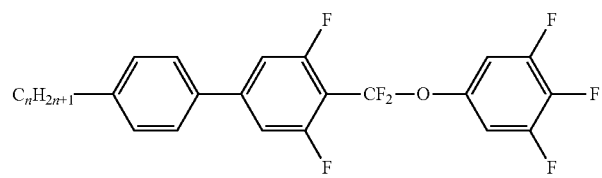

PUQU-n-F

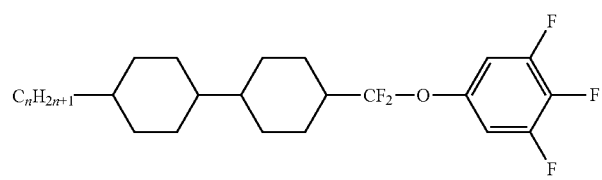

CCQU-n-F

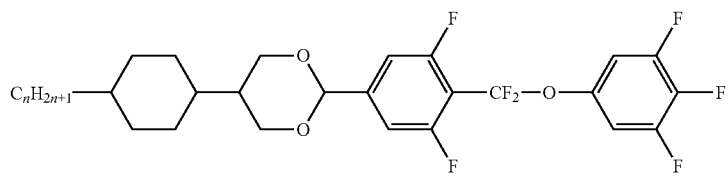

CDUQU-n-F

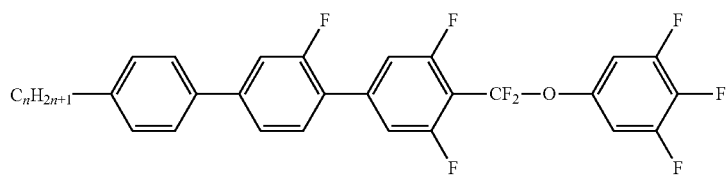

PGUQU-n-F

TABLE D-continued
Illustrative structures
The illustrative structures show compounds which are particularly preferably employed.
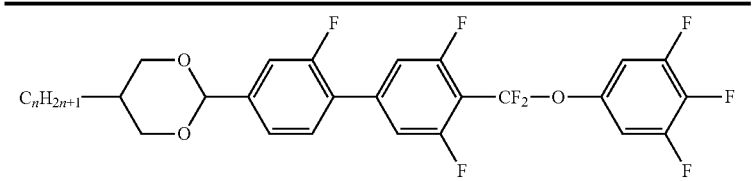
DGUQU-n-F
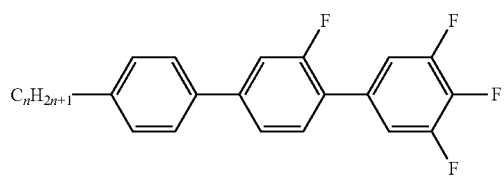
PGU-n-F
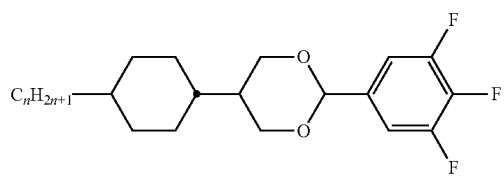
CDU-n-F
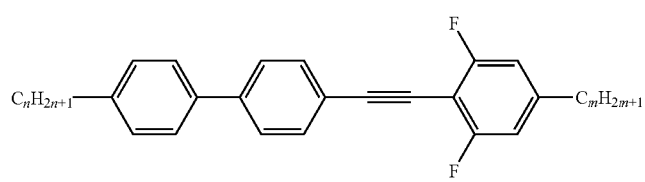
PPTUI-n-m
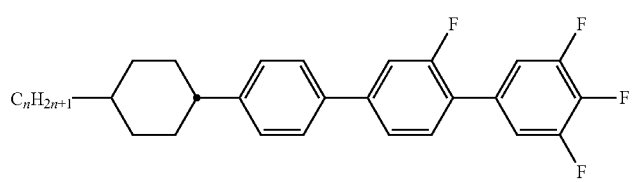
CPGU-n-F
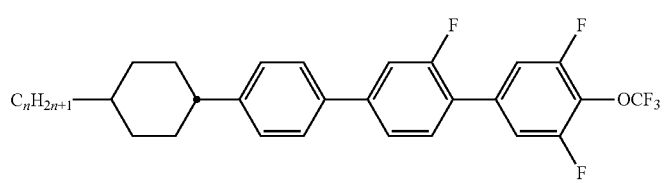
CPGU-n-OT
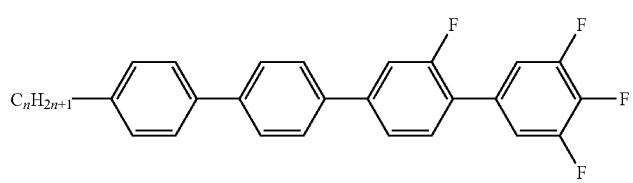
PGP-n-kVI TABLE D-continued
Illustrative structures
The illustrative structures show compounds which are particularly preferably employed.
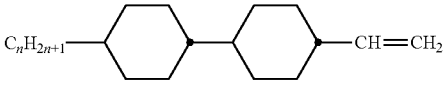
CC-n-V
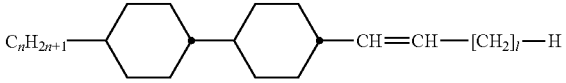
CC-n-Vl
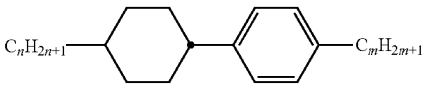
CP-n-m
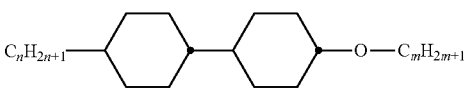
CC-n-Om
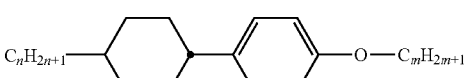
CP-n-Om
CCP-n-m
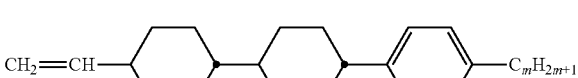
CCP-V-m
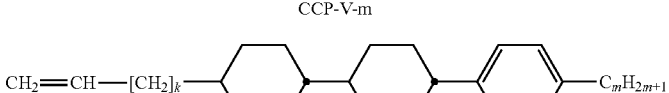
CCP-Vk-m
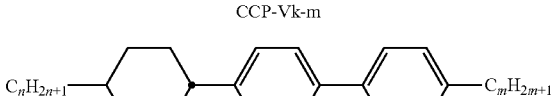
CPP-n-m
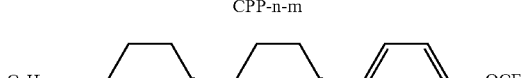
CCP-n-OT
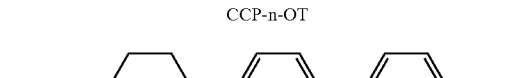
CPP-n-OT TABLE D-continued
Illustrative structures
The illustrative structures show compounds which are particularly preferably employed.
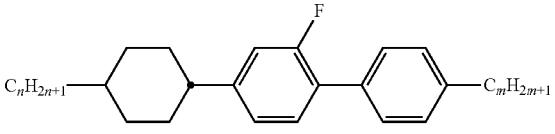
CGP-n-m
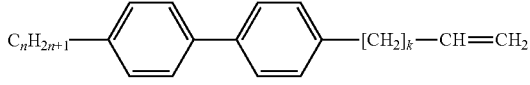
PP-n-kV
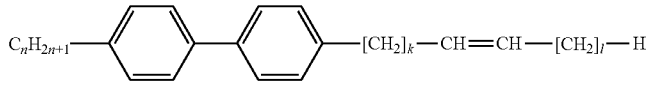
PP-n-kVI
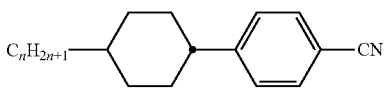
CP-n-N
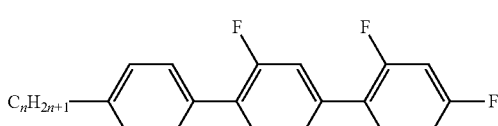
PGIGI-n-F
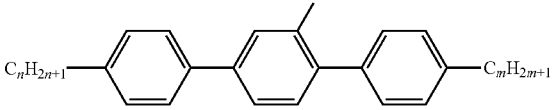
PGP-n-m
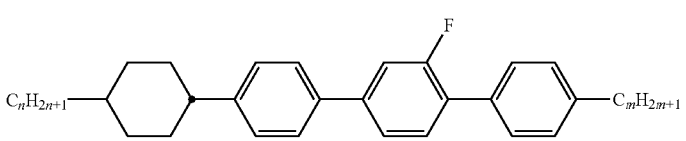
CPGP-n-m
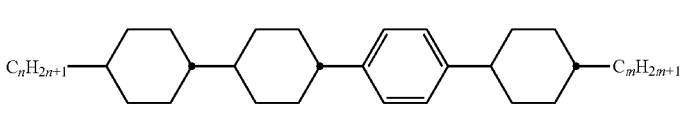
CCPC-n-m
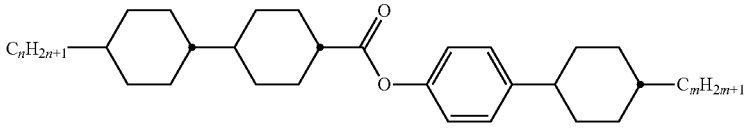
CCZPC-n-m Herein n ∈ {1;2;3;4;5;6;7}, m ∈ {1;2;3;4;5;6;7}, and k ∈ {1;2;3;4}, preferably 2 or 4, most preferably 2, and l ∈ {1;2;3}, preferably 1.
The following table, Table E, shows illustrative compounds which can be used as stabiliser in the liquid-crystal media in accordance with the present invention. The total concentration of these and similar compounds in the media is preferably 5% or less.
TABLE E
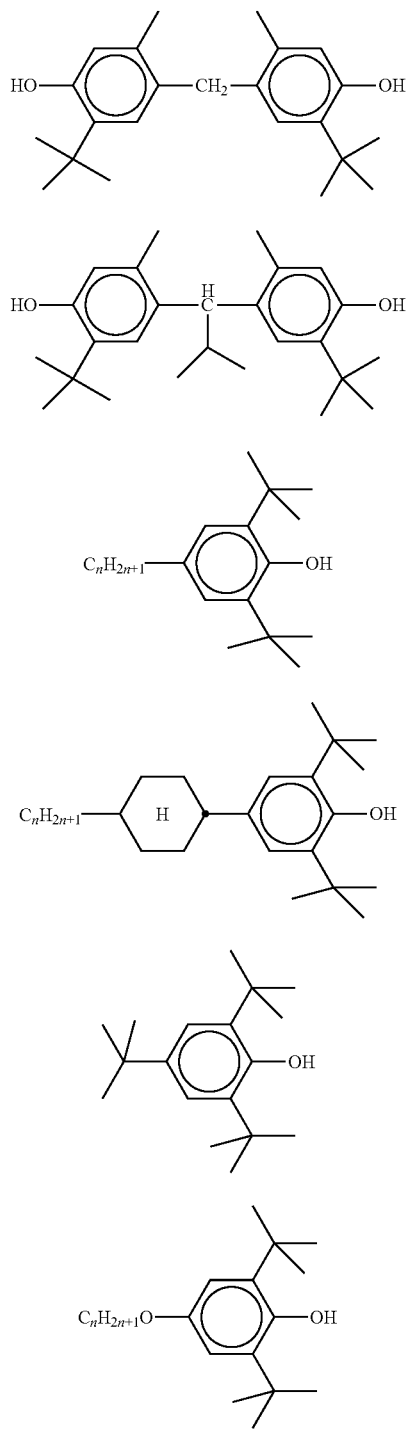
TABLE E-continued
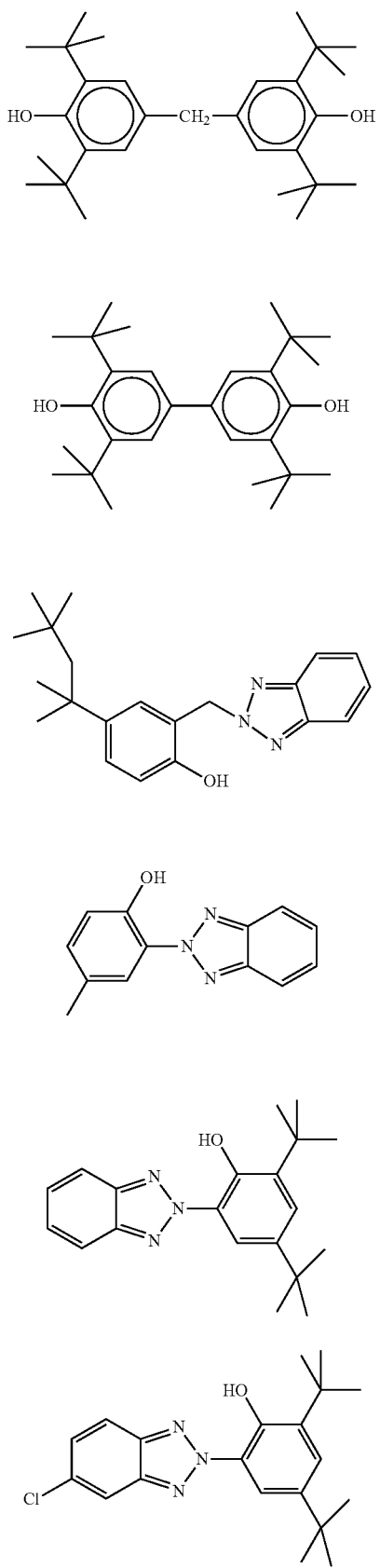

TABLE E-continued
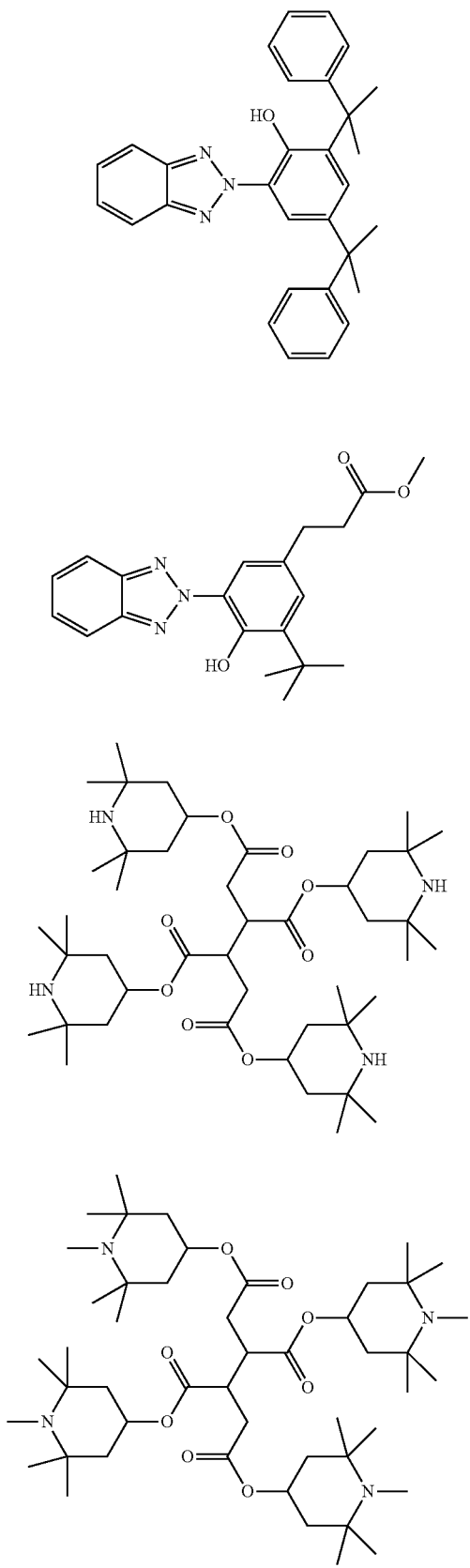
TABLE E-continued
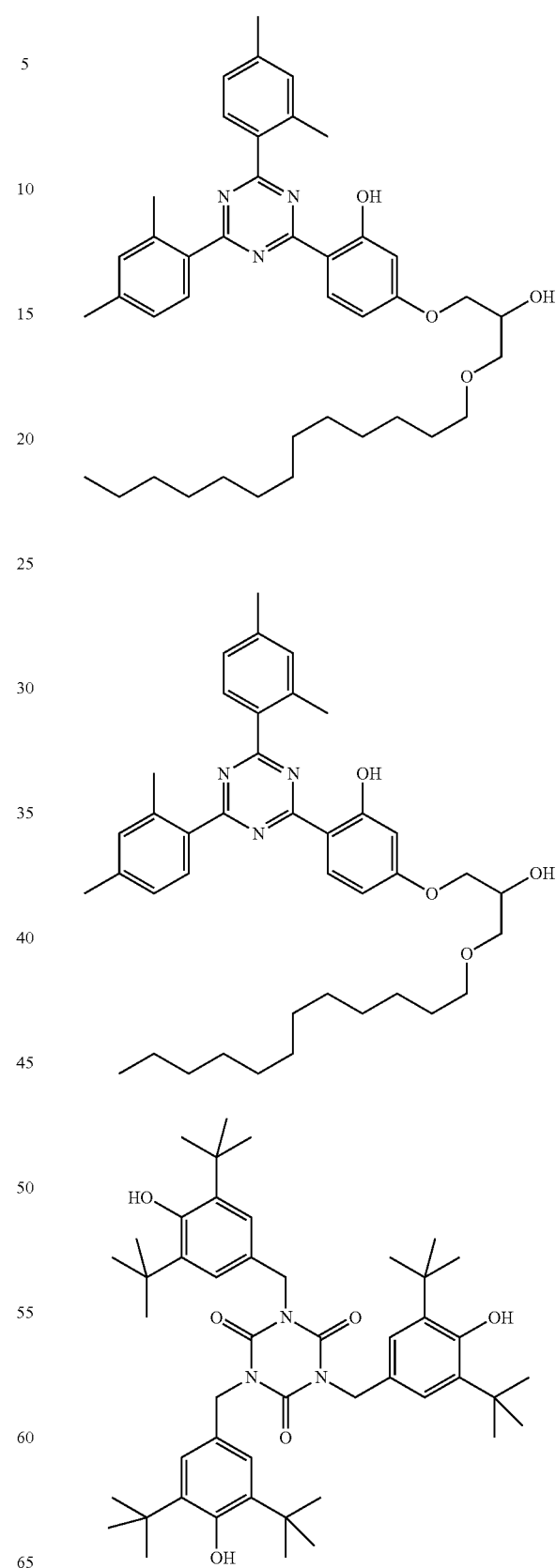

TABLE E-continued

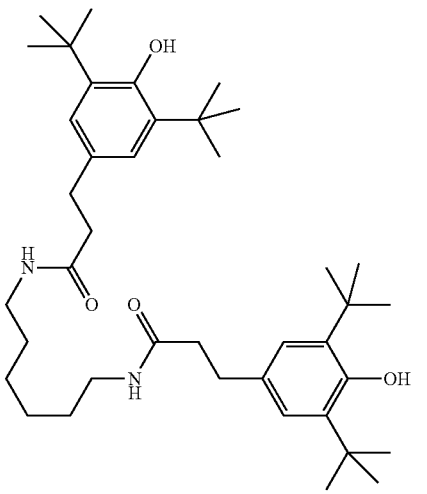 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

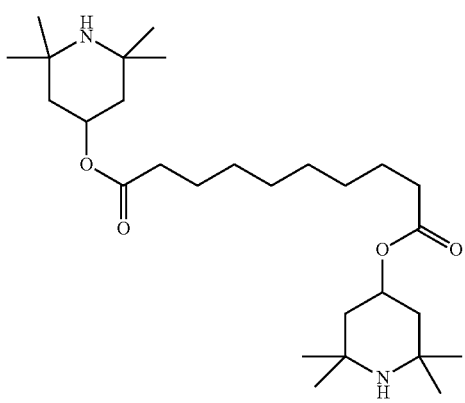

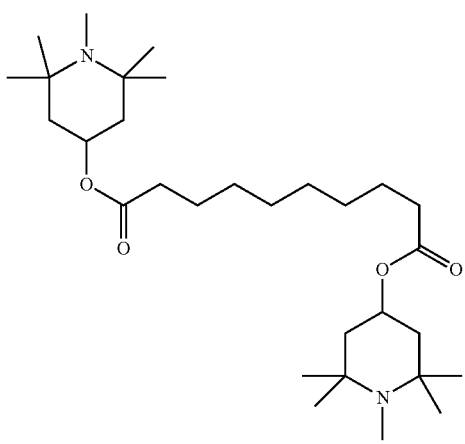

TABLE E-continued

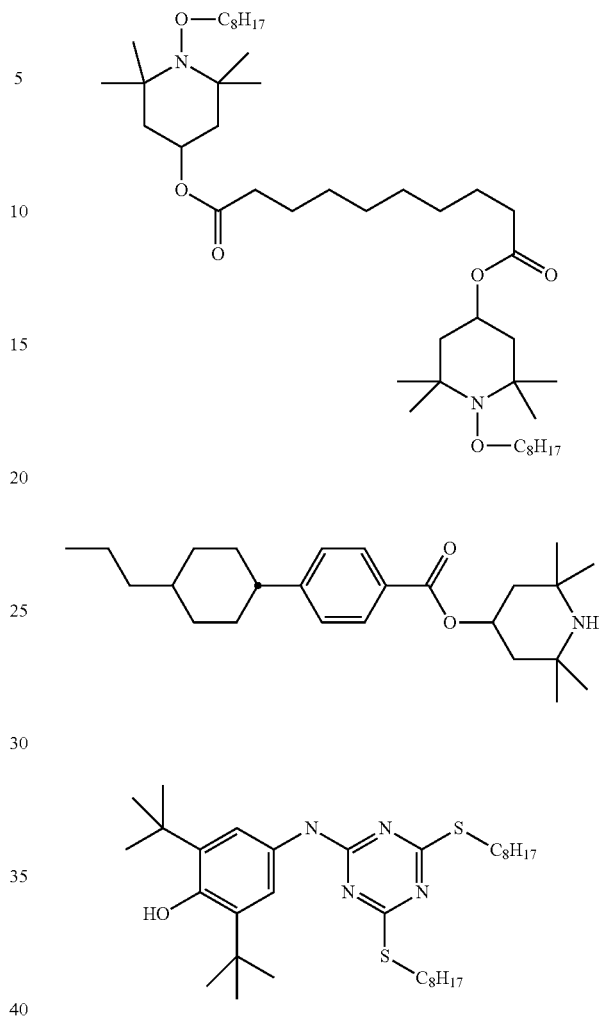

In a preferred embodiment of the present invention, the liquid-crystal media comprise one or more compounds selected from the group of the compounds from Table E.

The liquid-crystal media in accordance with the present invention preferably comprise two or more, preferably four or more, compounds selected from the group consisting of the compounds from the above tables.

The liquid-crystal media in accordance with the present invention preferably comprise seven or more, preferably eight or more, compounds, preferably compounds having three or more, preferably four or more, different formulae, selected from the group of the compounds from Table D.

EXAMPLES

The following examples illustrate the present invention without limiting it in any way. However, it becomes clear to the person skilled in the art from the physical properties what properties can be achieved and in what ranges they can be modified. In particular, the combination of the various properties which can preferably be achieved is thus well defined for the person skilled in the art.

EXAMPLES

The nematic liquid-crystal mixtures C1, N1, N2 and N3 are prepared as follows:

Comparative Example C1

| | | | |
|---|---|---|---|
| CC-3-V1 | 8.0% | $T_{(N,I)}$ [° C.]: | 101 |
| CCP-3-OT | 7.0% | Δn (589.3 nm, 20° C.) | 0.1364 |
| CCP-4-OT | 5.0% | $n_e$ (589.3 nm, 20° C.) | 1.6111 |
| CCQU-2-F | 9.0% | $n_o$ (589.3 nm, 20° C.) | 1.4747 |
| CCQU-3-F | 10.0% | Δε (1 kHz, 20° C.): | 35.0 |
| CDUQU-3-F | 10.0% | $ε_∥$ (1 kHz, 20° C.): | 40.4 |
| CPGU-3-OT | 8.0% | $ε_⊥$ (1 kHz, 20° C.): | 5.4 |
| DGUQU-4-F | 8.0% | $γ_1$ [mPa·s], (20° C.): | 258 |
| PGUQU-3-F | 8.0% | $K_1$ [pN], (20° C.): | 12.7 |
| PGUQU-4-F | 7.0% | $K_3$ [pN], (20° C.): | 12.1 |
| PGUQU-5-F | 6.0% | $V_0$ [V], (20° C.): | 0.63 |
| PUQU-3-F | 14.0% | | |
| Σ | 100.0% | | |

Mixture Example N1

| | | | |
|---|---|---|---|
| CC-3-V1 | 13.0% | $T_{(N,I)}$ [° C.]: | 95 |
| CCQU-2-F | 7.0% | Δn (589.3 nm, 20° C.) | 0.1336 |
| CCQU-3-F | 9.0% | $n_e$ (589.3 nm, 20° C.) | 1.6130 |
| CCQU-5-F | 8.0% | $n_o$ (589.3 nm, 20° C.) | 1.4794 |
| CDU-2-F | 7.0% | Δε (1 kHz, 20° C.): | 11.9 |
| CDU-3-F | 8.0% | $ε_∥$ (1 kHz, 20° C.): | 15.8 |
| CDUQU-3-F | 8.0% | $ε_⊥$ (1 kHz, 20° C.): | 3.9 |
| CPGU-3-OT | 8.0% | $γ_1$ [mPa·s], (20° C.): | 144 |
| CP-3-O1 | 13.0% | $K_1$ [pN], (20° C.): | 15.1 |
| PPTUI-3-4 | 15.0% | $K_3$ [pN], (20° C.): | 13.4 |
| PUQU-3-F | 4.0% | $V_0$ [V], (20° C.): | 1.17 |
| Σ | 100.0% | | |

Mixture Example N2

| | | | |
|---|---|---|---|
| CC-3-V1 | 6.0% | $T_{(N,I)}$ [° C.]: | 100 |
| CC-3-O1 | 10.0% | Δn (589.3 nm, 20° C.) | 0.1310 |
| CCPC-33 | 3.0% | $n_e$ (589.3 nm, 20° C.) | 1.6113 |
| CCQU-2-F | 8.0% | $n_o$ (589.3 nm, 20° C.) | 1.4803 |
| CCQU-3-F | 8.0% | Δε (1 kHz, 20° C.): | 9.1 |
| CCQU-5-F | 8.0% | $ε_∥$ (1 kHz, 20° C.): | 12.7 |
| CDU-3-F | 3.0% | $ε_⊥$ (1 kHz, 20° C.): | 3.7 |
| CDUQU-3-F | 12.0% | $γ_1$ [mPa·s], (20° C.): | 155 |
| CPGU-3-OT | 8.0% | $K_1$ [pN], (20° C.): | 15.4 |
| CP-3-O1 | 9.0% | $K_3$ [pN], (20° C.): | 14.4 |
| CP-3-O2 | 10.0% | $V_0$ [V], (20° C.): | 1.37 |
| PPTUI-3-4 | 15.0% | | |
| Σ | 100.0% | | |

Mixture Example N3

| | | | |
|---|---|---|---|
| CC-3-V1 | 6.0% | $T_{(N,I)}$ [° C.]: | 102.5 |
| CCH-3-O1 | 10.0% | Δn (589.3 nm, 20° C.) | 0.1445 |
| CCZPC-3-3 | 3.0% | $n_e$ (589.3 nm, 20° C.) | 1.6280 |
| CCQU-2-F | 6.0% | $n_o$ (589.3 nm, 20° C.) | 1.4835 |
| CCQU-3-F | 7.0% | Δε (1 kHz, 20° C.): | 8.1 |
| CCQU-5-F | 8.0% | $ε_∥$ (1 kHz, 20° C.): | 11.7 |
| CDU-3-F | 3.0% | $ε_⊥$ (1 kHz, 20° C.): | 3.6 |
| CDUQU-3-F | 10.0% | $γ_1$ [mPa·s], (20° C.): | 160.0 |
| CPGU-3-OT | 8.0% | $K_1$ [pN], (20° C.): | 16.1 |
| CP-3-O1 | 9.0% | $K_3$ [pN], (20° C.): | 15.3 |
| CP-3-O2 | 10.0% | $V_0$ [V], (20° C.): | 1.48 |
| PPTUI-3-4 | 20.0% | | |
| Σ | 100.0% | | |

The mixtures N1 to N3 are highly suitable for application in 3D lenses, especially of the plastic mould type.

Table 1 shows the variation of the thickness of an LC lens with the applied voltage, fabricated with liquid-crystal mixture N-1 in comparison with a lens fabricated with the medium C-1. The lenses are flattened upon application of an electric field.

Without wishing to be bound by theory, it is assumed that the higher voltage necessary to achieve a given thickness with the medium N1 according to the invention is due to the lower value of ell. Surprisingly, despite the higher switching voltage less cross-talk is observed in a device.

TABLE 1

| Lens Thickness | Voltage [V] | |
|---|---|---|
| [μm] | C-1 | N-1 |
| 33 | 0 | 0 |
| 25 | 1 | 2.5 |
| 20 | 2 | 4.5 |
| 15 | 4 | 8 |
| 10 | 6 | 12.5 |
| 5 | 12 | 19 |
| 1 | 33 | 33 |

The invention claimed is:

1. A liquid-crystal medium, comprising
   a) at least one compound of each of formulae I-1, at least one compound of formula I-2f-1, and optionally at least one compound of formula I-2, which is different from the compound of formula I-2f-1,

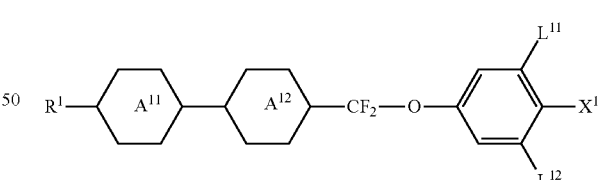

I-1

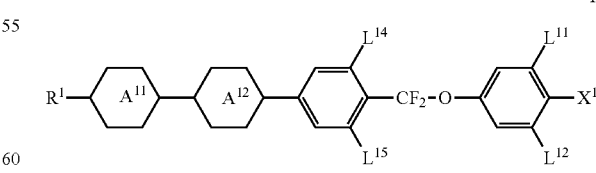

I-2 in which $R^1$ denotes H, alkyl or alkoxy having 1 to 12 C atoms, or alkenyl, alkenyloxy or alkoxyalkyl having 2 to 12 C atoms, in which one or more CH$_2$-groups may be replaced by

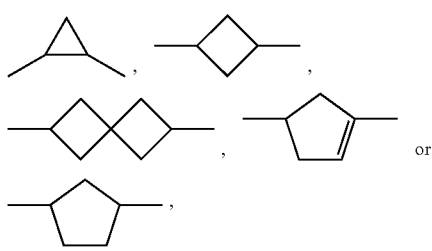

and in all of which one or more H atoms may be replaced by fluorine,

on each occurrence, independently of one another, denotes

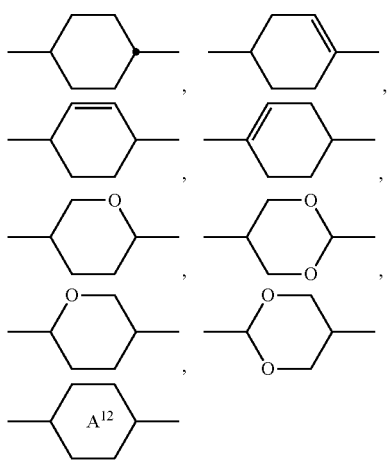

$A^{12}$ has one of the meanings given for

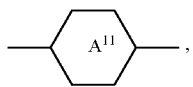

and alternatively denotes

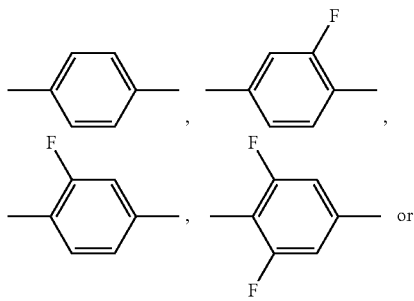

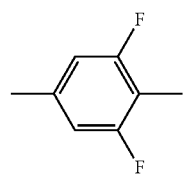

$L^{11}$ and $L^{12}$, independently of one another, denote H or F,
$L^{14}$ and $L^{15}$ independently of one another, denote H or F,
$X^1$ denotes F, Cl, CN, $CF_3$ or $OCF_3$,

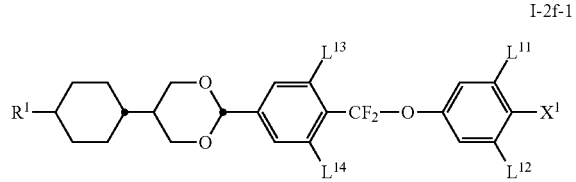

I-2f-1 in which $X^1$ is F, and $L^{11}$, $L^{12}$, $L^{13}$ and $L^{14}$ are each independently H or F, and b) one or more compounds of formula II-3

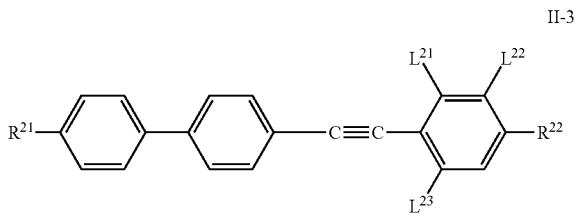

II-3 in which $R^{21}$ and $R^{22}$ denotes H, alkyl or alkoxy having 1 to 12 C atoms, or alkenyl, alkenyloxy or alkoxyalkyl having 2 to 12 C atoms, in which one or more $CH_2$-groups may be replaced by

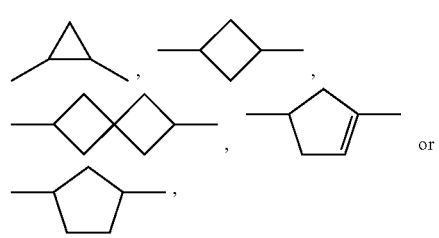

and in which one or more H atoms may be replaced by fluorine, $L^{21}$ to $L^{23}$ independently of one another denote H or F, and c) one or more compounds of formula D

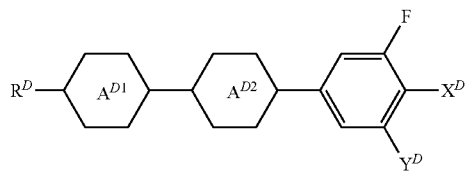

in which
one of

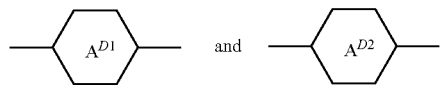

denotes

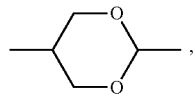

and
the other of

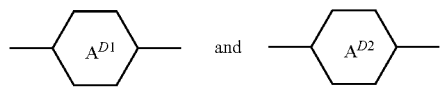

denotes

$R^D$ denotes H, alkyl or alkoxy having 1 to 12 C atoms, or alkenyl, alkenyloxy or alkoxyalkyl having 2 to 12 C atoms, in which one or more CH$_2$-groups may be replaced by

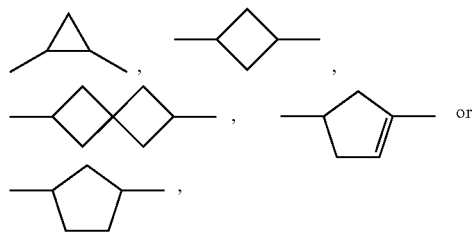

and in which one or more H atoms may be replaced by fluorine, $X^D$ denotes F, CF$_3$ or OCF$_3$, and $Y^D$ denotes H or F.

2. The liquid-crystal medium according to claim 1, wherein the medium comprises one or more compounds of formula V

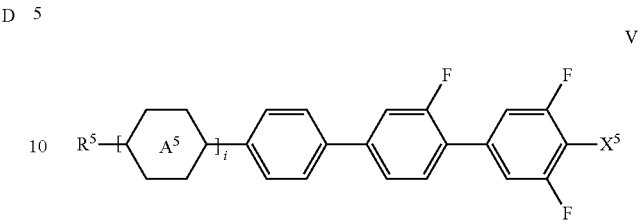

in which

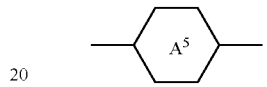

denotes

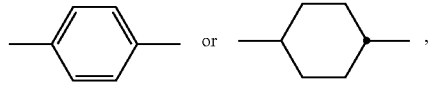

$R^5$ is alkyl having 1 to 20 C atoms, which is straight chain or branched, is non-substituted, mono- or poly-substituted by F, Cl or CN, and in which one or more CH$_2$ groups are optionally replaced, in each case independently from one another, by —O—, —S—, —CO—, —COO—, —OCO—, —OCO—O—, —S—CO—, —CO—S—, —CH=CH— or —C≡C— in such a manner that O and/or S atoms are not linked directly to one another, $X^5$ is halogen, CF$_3$ or OCF$_3$, and i is 0 or 1.

3. The liquid-crystal medium according to claim 1, wherein the medium comprises one or more compounds of formulae II-1 or II-2

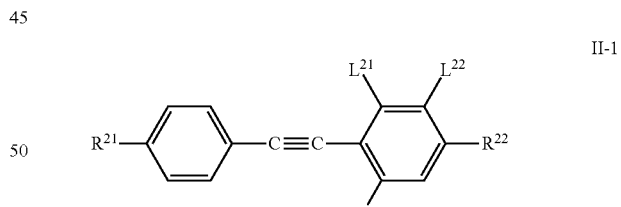

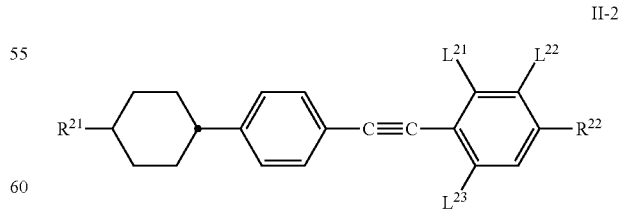

in which the occurring groups have the meanings given in claim 1.

4. The liquid-crystal medium according to claim 1, wherein the medium comprises one or more compounds of formula III

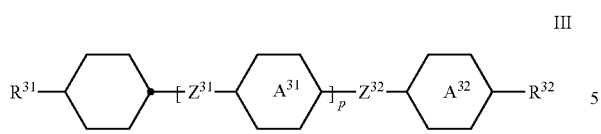   III in which
R$^{31}$, R$^{32}$ is alkyl having 1 to 20 C atoms, which is straight chain or branched, is non-substituted, mono- or poly-substituted by F, Cl or CN, and in which one or more CH$_2$ groups are optionally replaced, in each case independently from one another, by —O—, —S—, —CO—, —COO—, —OCO—, —OCO—O—, —S—CO—, —CO—S—, —CH=CH— or —C≡C— in such a manner that O and/or S atoms are not linked directly to one another,

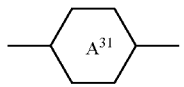

to

are independently of each other

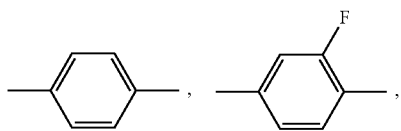

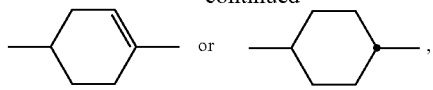

Z$^{31}$ and Z$^{32}$ on each occurrence, identically or differently, denote —CH$_2$CH$_2$—, —CF$_2$CF$_2$—, —CF$_2$CH$_2$—, —COO—, trans- —CH=CH—, trans- —CF=CF—, —CH$_2$O—, —CF$_2$O—, —C≡C— or a single bond
p is 0, 1 or 2.

5. The liquid-crystal medium according to claim 4, wherein the medium comprises a compound of formula III-3

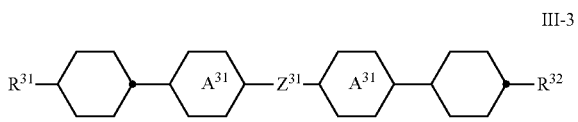   III-3 in which the occurring groups have the meanings given for formula III in claim 4.

6. The liquid-crystal medium according to claim 1, wherein the medium has a clearing temperature of 90° C. or more.

7. The liquid-crystal medium according to claim 1, wherein the medium has a dielectric anisotropy in the range of from 2 to 20, measured at 1 kHz and 20° C.

8. A process for the preparation of a liquid-crystal medium according claim 1, wherein one or more compounds of formula I-1, one or more compounds of formula I-2f-1, and optionally one or more compounds of formula I-2 different from formula I-2f-1, one or more compounds of formula II-3, and one or more compounds of formula D are mixed with one or more further compounds and/or with one or more additives.

9. A 3D lens, containing a liquid-crystal medium according to claim 1.

10. A liquid crystal display comprising one or more 3D lenses according to claim 9.

11. A process for operating a 3D liquid crystal display by addressing one or more 3D lenses according to claim 9.

* * * * *